(12) United States Patent
Kim et al.

(10) Patent No.: US 10,996,848 B2
(45) Date of Patent: May 4, 2021

(54) WEARABLE ELECTRONIC DEVICE

(71) Applicant: KOREA ELECTRONICS TECHNOLOGY INSTITUTE, Seongnam-si (KR)

(72) Inventors: Kunnyun Kim, Yongin-si (KR); Yeonhwa Kwak, Seoul (KR); Won Hyo Kim, Yongin-si (KR); Kwang Bum Park, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 16/789,326

(22) Filed: Feb. 12, 2020

(65) Prior Publication Data
US 2020/0183576 A1 Jun. 11, 2020

Related U.S. Application Data

(63) Continuation of application No. 15/535,868, filed as application No. PCT/KR2015/010648 on Oct. 8, 2015, now Pat. No. 10,599,327.

(30) Foreign Application Priority Data

Dec. 24, 2014 (KR) .......... 10-2014-0188712
Dec. 24, 2014 (KR) .......... 10-2014-0188713

(51) Int. Cl.
*G06F 3/048* (2013.01)
*G06F 3/0488* (2013.01)
(Continued)

(52) U.S. Cl.
CPC ......... *G06F 3/04883* (2013.01); *G04C 3/001* (2013.01); *G04G 21/08* (2013.01);
(Continued)

(58) Field of Classification Search
CPC .... G06F 3/04883; G06F 3/0488; G06F 3/017; G06F 3/0486; G06F 3/0482; G06F 1/163;
(Continued)

(56) References Cited

U.S. PATENT DOCUMENTS 6,556,222 B1 4/2003 Narayanaswami
9,541,955 B2 * 1/2017 Holtzman ............. G06F 1/1652
(Continued)

FOREIGN PATENT DOCUMENTS

CN 103941846 A 7/2014
KR 10-2013-0088861 A1 8/2013
(Continued)

OTHER PUBLICATIONS

Office Action in corresponding Korean Patent Application No. 10-2016-0188713 dated Mar. 12, 2019, 8 pages.
(Continued)

*Primary Examiner* — Linh K Pham
(74) *Attorney, Agent, or Firm* — Knobbe Martens Olson & Bear LLP

(57) ABSTRACT

The described technology relates to a wearable electronic device. The wearable electronic device may include a touch display, a rim surrounding the touch display, a rim touch sensor disposed on at least a portion of the rim, a band portion that allows the wearable electronic device to be worn on a user's wrist, and a control unit configured to receive a rim touch on the rim through the rim touch sensor and generate a control signal for controlling the wearable electronic device based on at least one of attributes of the rim touch.

13 Claims, 16 Drawing Sheets

(51) Int. Cl.
*G06F 1/16* (2006.01)
*G04C 3/00* (2006.01)
*G06F 3/023* (2006.01)
*G06F 3/0354* (2013.01)
*G04G 21/08* (2010.01)
*G06F 3/0482* (2013.01)

(52) U.S. Cl.
CPC .............. *G06F 1/163* (2013.01); *G06F 1/169* (2013.01); *G06F 3/0236* (2013.01); *G06F 3/03547* (2013.01); *G06F 3/0482* (2013.01); *G06F 2203/0339* (2013.01); *G06F 2203/04808* (2013.01)

(58) Field of Classification Search
CPC ........ G06F 3/011; G06F 3/014; G06F 3/0304; G06F 19/3418; G06F 19/3481; G06F 1/08; G06F 3/0418; G06F 3/03547; G06F 2203/04106
See application file for complete search history.

(56) References Cited

U.S. PATENT DOCUMENTS

| | | |
|---|---|---|
| 10,114,501 B2 | 10/2018 | Yoon et al. |
| 10,365,811 B2 | 7/2019 | Robinson et al. |
| 10,412,208 B1* | 9/2019 | Minoo ................ H04M 19/047 |
| 2001/0043514 A1* | 11/2001 | Kita ..................... G04G 17/083 368/281 |
| 2006/0139320 A1 | 6/2006 | Lang |
| 2007/0247976 A1 | 10/2007 | Capozzi et al. |
| 2009/0160808 A1* | 6/2009 | Wu ......................... G06F 3/044 345/173 |
| 2010/0007630 A1 | 1/2010 | Chang |
| 2010/0219943 A1* | 9/2010 | Vanska .................... G06F 1/163 340/407.1 |
| 2012/0105358 A1 | 5/2012 | Momeyer et al. |
| 2012/0194976 A1* | 8/2012 | Golko ..................... H04M 1/04 361/679.01 |
| 2014/0009415 A1 | 1/2014 | Nishida |
| 2014/0215365 A1 | 7/2014 | Hiraga et al. |
| 2015/0049591 A1 | 2/2015 | Adams et al. |
| 2015/0153854 A1* | 6/2015 | Stewart ................. G04G 21/08 345/173 |
| 2015/0177909 A1* | 6/2015 | Hoffman ............... G06F 3/0421 345/175 |
| 2015/0323998 A1 | 11/2015 | Kudekar et al. |
| 2016/0044151 A1 | 2/2016 | Shoemaker et al. |
| 2016/0073914 A1 | 3/2016 | Lapetina et al. |
| 2016/0165450 A1 | 6/2016 | Hunt et al. |
| 2016/0252985 A1 | 9/2016 | Tsai et al. |
| 2016/0299570 A1 | 10/2016 | Davydov |

FOREIGN PATENT DOCUMENTS

| | | |
|---|---|---|
| WO | 2009/032375 A1 | 3/2009 |
| WO | 2012/061136 A2 | 5/2012 |

OTHER PUBLICATIONS

Office Action in corresponding Chinese Patent Application No. 201580071142.X dated Jun. 28, 2019, 29 pages.
International Search Report in corresponding International Patent Application No. PCT/KR2015/010648 dated Feb. 15, 2016.

* cited by examiner

WEARABLE ELECTRONIC DEVICE

INCORPORATION BY REFERENCE TO ANY RELATED APPLICATIONS

This is a continuation application of U.S. patent application Ser. No. 15/535,868 filed on Jun. 14, 2017, which is a national phase of PCT/KR2015/010648 filed on Oct. 8, 2015, which claimed priority to Korean Patent Application Nos. 10-2014-0188712 and 10-2014-0188713 both filed on Dec. 24, 2014, contents of each of which are incorporated herein by reference in their entireties.

TECHNICAL FIELD

The described technology generally relates to a wearable electronic device, and more specifically, to a wearable electronic device that provides a more convenient user interface for controlling an operation of the wearable electronic device.

DESCRIPTION OF THE RELATED TECHNOLOGY

Recently, remarkable development of smart devices such as smart phones, smart watches, smart glasses, etc. is providing a convenient environment to the public in the daily life. In particular, a smart watch is one of the most popular wearable devices.

A smart watch has been developed to include a touch screen and provide a user interface through the touch screen, similarly to a conventional smart phone. However, a smart watch has a smaller display screen than a smart phone or a tablet PC. Accordingly, when a touch input through the touch screen is provided as a user interface, the screen is hidden by a user's finger or a touch pen and thus the probability that the user will feel inconvenience is very high.

To solve such a problem, it is urgent to develop a more convenient and intuitive user interface that can be applied to a wearable device such as a smart watch.

SUMMARY

One inventive aspect is to provide a wearable electronic device that provides a more convenient user interface for controlling an operation of the wearable electronic device.

Technical problems to be solved by the present invention are not limited to the aforementioned problems, and other technical problems that are not described herein should be clearly understood by those skilled in the art from the following description and the accompanying drawings.

According to an aspect of the present invention, there is provided a wearable electronic device including a touch display; a rim surrounding the touch display; a rim touch sensor disposed on at least a portion of the rim; a band portion that allows the wearable electronic device to be worn on a user's wrist; and a control unit configured to receive a rim touch on the rim through the rim touch sensor and generate a control signal for controlling the wearable electronic device based on at least one of attributes of the rim touch.

According to another aspect of the present invention, there is provided a wearable electronic device including a touch display; a rim surrounding the touch display; a rim touch sensor disposed on at least a portion of the rim; a band portion that allows the wearable electronic device to be worn on a user's wrist; and a control unit configured to receive a first rim touch and a second rim touch on the rim through the rim touch sensor and generate a control signal for controlling the wearable electronic device based on one of at least one of attributes of the first rim touch and at least one of attributes of the second rim touch.

Technical solutions of the present invention are not limited to the aforementioned solutions, and other technical solutions that are not described herein should be clearly understood by those skilled in the art from the following description and the accompanying drawings.

According to the described technology, it is possible to receive a user input without covering a display of a wearable device. Moreover, according to the described technology, it is possible to provide a user interface having enhanced usability and immediacy.

Advantageous effects of the described technology are not limited to the aforementioned effects, and other advantageous effects that are not described herein should be clearly understood by those skilled in the art from the following description and the accompanying drawings.

DETAILED DESCRIPTION OF CERTAIN INVENTIVE EMBODIMENTS

Figure 1:
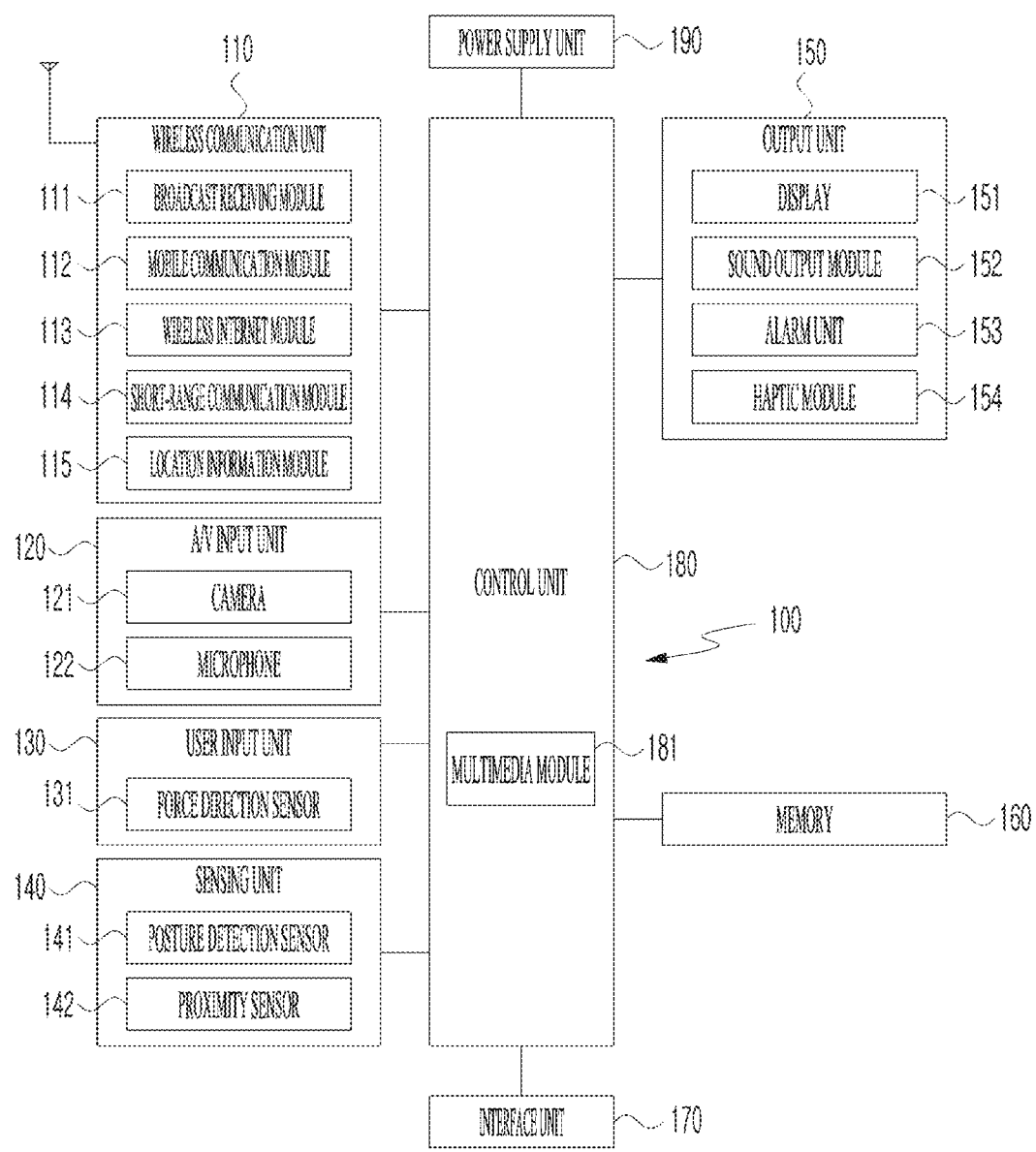
FIG. 1 is a block diagram of a wearable electronic device according to embodiments of the present invention.

The present invention relates to a wearable electronic device worn on a user's wrist and may include a touch display; a rim surrounding the touch display; a rim touch sensor disposed on at least a portion of the rim; a band portion that allows the wearable electronic device to be worn on the user's wrist; and a control unit configured to receive a rim touch on the rim through the rim touch sensor and generate a control signal for controlling the wearable electronic device based on at least one attribute of the rim touch.

Embodiments described in this specification have been made to clearly explain the scope of the invention to those having ordinary skill in the art, and do not intend to limit the present invention. The present invention should be interpreted as including variations and modifications within the technical scope of the present invention.

The terms used in this specification are selected from general terms, which are currently widely used, on the basis of functions of the present invention, and may have meanings that vary according to the intentions of those skilled in the art, the custom in the field of art, or the advance of new technology. When a specific term is used with a arbitrary meaning, the meaning of the term will be described separately. Accordingly, the terms used in this specification are not to be defined as simple names of the components, but should be defined on the basis of the actual meaning of the terms and the whole context throughout the present specification.

The accompanying drawings are to facilitate the explanation of the present invention, and a shape in the drawings may be exaggerated for the purpose of convenience of explanation so the present invention is not limited to the drawings.

In addition, details of generally known functions and structures which obscure the subject matter of the present invention will be omitted.

According to an aspect of the present invention, a wearable electronic device including a touch display; a rim surrounding the touch display; a rim touch sensor disposed on at least a portion of the rim; a band portion that allows the wearable electronic device to be worn on a user's wrist; and a control unit configured to receive a rim touch on the rim through the rim touch sensor and generate a control signal for controlling the wearable electronic device based on at least one of attributes of the rim touch is provided.

The attributes of the rim touch may include at least one of a rim touch position, a rim touch duration time, a rim touch rotating direction, a rim touch pressure, and a rim touch shear force direction.

The control unit may receive a display touch through the touch display and may generate a control signal for controlling the wearable electronic device based on the display touch and at least one of the attributes of the rim touch.

The control unit may select at least one item displayed through the touch display based on the display touch, select an additional item function to be performed on the selected at least one item based on at least one of the attributes of the rim touch, and generate a control signal corresponding to the selected additional item function.

The control unit may select a screen to be displayed through the touch display based on the display touch, select an additional screen function to be performed on the selected screen based on at least one of the attributes of the rim touch, and generate a control signal corresponding to the selected additional screen function.

The control unit may select a main function based on the display touch, select one of a plurality of sub-functions of the selected main function based on at least one of the attributes of the rim touch, and generate a control signal corresponding to the selected sub-function.

The control unit may select a main function based on at least one of the attributes of the rim touch, select one of a plurality of sub-functions of the selected main function based on the display touch, and generate a control signal corresponding to the selected sub-function.

According to another aspect of the present invention, a wearable electronic device including a touch display; a rim surrounding the touch display; a rim touch sensor disposed on at least a portion of the rim; a band portion that allows the wearable electronic device to be worn on a user's wrist; and a control unit configured to receive a first rim touch and a second rim touch on the rim through the rim touch sensor and generate a control signal for controlling the wearable electronic device based on at least one of attributes of the first rim touch and at least one of attributes of the second rim touch.

The attributes of the rim touch may include at least one of a rim touch position, a rim touch duration time, a rim touch rotating direction, a rim touch pressure, and a rim touch shear force direction.

The control unit may generate a control signal for controlling the wearable electronic device based on at least two of the attributes of the first rim touch and at least two of the attributes of the second rim touch.

The control unit may perform a first operation when a first rotating direction of the first rim touch and a second rotating direction of the second rim touch are the same and perform a second operation when the first rotating direction and the second rotating direction are opposite to each other.

The control unit may perform a third operation when a first shear force direction of the first rim touch and a second shear force direction of the second rim touch are the same and perform a fourth operation when the first shear force direction and the second shear force direction are different from each other.

In the following description, a configuration of a wearable electronic device related to some embodiments of the present invention will be schematically described first, and then an operation of the wearable electronic device according to embodiments of the present invention will be described in detail.

<Configuration of Wearable Electronic Device>

FIG. 1 is a block diagram of a wearable electronic device according to embodiments of the present invention.

A wearable electronic device 100 may include a wireless communication unit 110, an audio/video (AV) input unit 120, a user input unit 130, a sensing unit 140, an output unit 150, a memory 160, an interface unit 170, a control unit 180, a power supply unit 190, etc. The components shown in FIG. 1 are not essential. Thus, the wearable electronic device 100 may be implemented to have more or fewer components than are shown.

Hereinafter, the components will be described in turn.

The wireless communication unit 110 may include one or more modules that enable wireless communication between the wearable electronic device 100 and a wireless communication system or between the wearable electronic device 100 and a network in which the wearable electronic device 100 is located. For example, the wireless communication unit 110 may include a broadcast receiving module 111, a mobile communication module 112, a wireless Internet module 113, a short-range communication module 114, a location information module 115, etc.

The broadcast receiving module 111 receives a broadcast signal and/or broadcast-related information from an external broadcast management server through a broadcast channel.

The broadcast channel may include a satellite channel and a terrestrial channel. The broadcast management server may be a server for generating and transmitting a broadcast signal and/or broadcast-related information, or a server for receiving already generated a broadcast signal and/or broadcast-related information and transmitting the received broadcast signal and/or broadcast-related information to a terminal. The broadcast signal may include a TV broadcast signal, a radio broadcast signal, and a data broadcast signal as well as a broadcast signal in which a data broadcast signal is combined with a TV broadcast signal or a radio broadcast signal.

The broadcast-related information may refer to information associated with a broadcast channel, a broadcast program, or a broadcast service provider. The broadcast-related information may even be provided through a mobile communication network. In this case, the broadcast-related information may be received by the mobile communication module 112.

The broadcast-related information may be provided in various forms. For example, the broadcast-related information may be provided in the form of an Electronic Program Guide (EPG) of Digital Multimedia Broadcasting (DMB) or an Electronic Service Guide (ESG) of Digital Video BroadcastHandheld (DVBH).

The broadcast receiving module 111 may receive broadcast signals using various broadcast systems. In particular, the broadcast receiving module 111 may receive digital broadcast signals using digital broadcast systems such as Digital Multimedia BroadcastingTerrestrial (DMBT), Digital Multimedia BroadcastingSatellite (DMBS), Media Forward Link Only (MediaFLO), Digital Video Broadcast-Handheld (DVBH), and Integrated Services Digital BroadcastTerrestrial (ISDBT). The broadcast receiving module 111 may be configured to be suitable for another broadcast system that provides broadcast signals as well as the above-described digital broadcast systems.

The broadcast signal and/or broadcast-related information received through the broadcast receiving module 111 may be stored in the memory 160.

The mobile communication module 112 transmits and/or receives wireless signals to and/or from at least one of a base station, an external terminal, and a server over a mobile communication network. The wireless signal may include various forms of data according to transmission or reception of a voice call signal, a video call signal, or a text/multimedia message.

The wireless Internet module 113 refers to a module for wireless Internet access. The wireless Internet module 113 may be mounted inside or outside the wearable electronic device 100. Wireless LAN (WLAN), wireless fidelity (WiFi), wireless broadband (Wibro), world interoperability for microwave access (Wimax), or high speed downlink packet access (HSDPA) may be used as a wireless Internet technology.

The short-range communication module 114 refers to a module for short-range communication. Bluetooth, radio frequency identification (RFID), infrared data association (IrDA), ultra wideband (UWB), ZigBee, WiHD, or WiGig may be used as a short-range communication technology.

The location information module 115 refers to a module for confirming or obtaining a location of the electronic device. A representative example of the location information module is a Global Position System (GPS) module. According to a current technology, the GPS module 115 may calculate three-dimensional location information according to a latitude, longitude, and altitude of one point (an entity) at one time by calculating information regarding distances by which the one point (the entity) is separated from three or more satellites and information regarding a time at which the distance information is measured and then applying trigonometry to the calculated distance information. Furthermore, a method of calculating the location information and the time information using three satellites and modifying errors of the calculated location information and time information using another satellite is also used. The GPS module 115 may continuously calculate a current location of the electronic device in real time and calculate speed information using the calculated current location.

Referring to FIG. 1, the A/V input unit 120 is configured to input an audio signal or a video signal and may include a camera 121, a microphone 122, etc. The camera 121 processes a still image or a video frame of a video that is obtained by an image sensor in a video call mode or a capturing mode. The processed video frame may be displayed on a display 151.

The video frame processed by the camera 121 may be stored in the memory 160 or may be transmitted to the outside through the wireless communication unit 110. Two or more cameras 121 may be provided according to an implemented aspect of the wearable electronic device 100.

The microphone 122 receives an external sound signal through a microphone in a call mode, a recording mode, or a voice recognition mode and processes the received sound signal as electrical voice data. The voice data may be converted and output in a form that is capable of being transmitted to a mobile communication base station through the mobile communication module 112 in the call mode. The microphone 122 may be implemented with various noise removal algorithms for eliminating noise generated in receiving an external sound signal.

The user input unit 130 generates input data used by a user to control an operation of the wearable electronic device 100. The user input unit 130 may include a keypad, a dome switch, a touch pad (resistive/capacitive), a jog wheel, and a jog switch.

The user input unit 130 may include a force direction sensor 131 for detecting a force direction of a touch and/or a contact. The force direction sensor 131 may be a unit for detecting a position of the touch and/or contact that may be implemented by a general touch screen and/or touch pad as well as for detecting the force direction of the touch and/or the contact.

According to the described technology, the force direction conceptually includes a shear force acting in a direction parallel to a touch surface, which cannot be detected by conventional touch sensors. That is, the force direction sensor 131 according to an embodiment of the present invention may detect a direction of a shear force acting in the direction parallel to the touch surface as well as a force direction vertical to the touch surface.

The force direction sensor 131 may be manufactured integrally with a conventional touch screen and configured to detect a touch and/or a contact on the touch screen. Alternatively, the force direction sensor 131 may be separately provided at a portion or the entirety of a rim located at an edge to surround the display 151 of the wearable electronic device according to the described technology, and may be configured to detect a touch and/or a contact on the rim. A detailed operation of the force direction sensor 131 will be described below.

Figure 3:
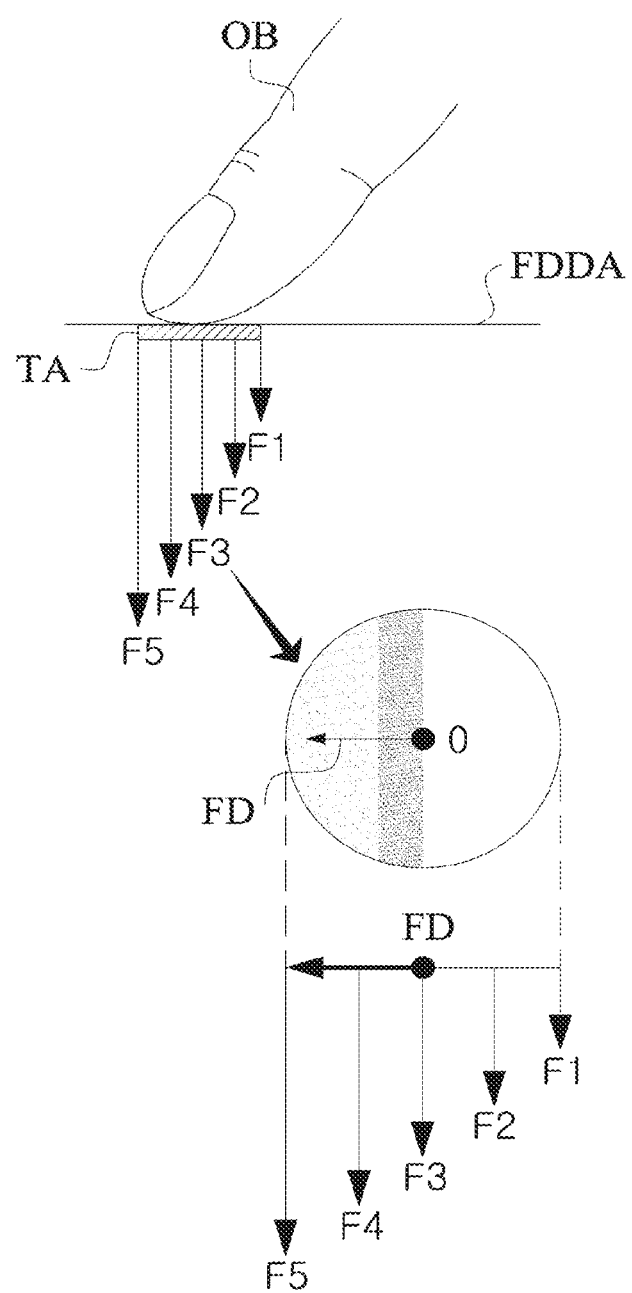
FIG. 3 is a schematic diagram showing an example of a process of detecting a force direction using a force intensity according to an embodiment of the present invention.

The sensing unit 140 may detect a current state of the wearable electronic device 100 such as an open/close state of the wearable electronic device 100, a location of the wearable electronic device 100, a presence or absence of a contact of a user, an orientation of the electronic device, and acceleration/deceleration of the electronic device and generate a sensing signal for controlling an operation of the wearable electronic device 100. Also, the sensing unit 140 may be responsible for a sensing function associated with whether the power supply unit 190 supplies power, whether the interface unit 170 is combined with an external device, etc. The sensing unit 140 may include a posture detection sensor 141 and/or a proximity sensor 142. Also, the sensing unit 140 may include a biometric sensor configured to measure various biometric signals of the user. Also, the sensing unit 140 may include a connection detection sensor configured to determine whether the user wears the wearable electronic device 100. Also, the sensing unit 140 may include a bending sensor configured to determine whether band portions BP1 and BP2 of the wearable electronic device 100 are bent or flat. When a force direction sensor to be described with reference to FIG. 3 is provided in the band portion, the force direction sensor may function as the bending sensor.

The output unit 150 may include the display 151, a sound output module 152, an alarm unit 153, a haptic module 154, etc., for generating an output related to a visual, auditory, or tactile sense.

The display 151 displays and outputs information processed by the wearable electronic device 100. For example, when the electronic device is in a call mode, the display 151 displays a user interface (UI) or graphic user interface (GUI) associated with a call. The wearable electronic device 100 displays a captured and/or received image, a UI, or a GUI when the wearable electronic device 100 is in a video call mode or a capture mode.

The display 151 may include at least one of a liquid crystal display (LCD), a thin film transistor-LCD (TFT-LCD), an organic light emitting diode (OLED) display, a flexible display, and a three-dimensional (3D) display.

Depending on an implementation of the wearable electronic device 100, there may be two or more displays 151. For example, a plurality of displays may be separately or integrally disposed on one surface of the wearable electronic device 100 or may be disposed on different surfaces thereof. Alternatively, the display 151 may be logically divided into two or more portions.

In a case in which the display 151 and a sensor for detecting a touch operation (hereinafter referred to as a "touch sensor") are mutually layered in a structure (hereinafter, simply referred to as a "touch screen"), the display 151 may be used as an input device as well as an output device. The touch sensor may have a form such as, for example, a touch film, a touch sheet, and a touch pad.

The touch sensor may be configured to convert a change in pressure applied to a specific portion of the display 151 or a change in capacitance generated at a specific portion of the display 151 into an electronic input signal.

When a touch input is applied to the touch sensor, a signal(s) corresponding to the touch input is(are) sent to a touch controller. The touch controller processes the signal(s) and then transmits data corresponding thereto to the control unit 180. Accordingly, the control unit 180 may recognize which portion of the display 151 was touched.

Referring to FIG. 1, the proximity sensor 142 may be disposed inside an electronic device surrounded by the touch screen or disposed near the touch screen. The proximity sensor 142 refers to a sensor configured to detect a presence or absence of an object approaching a predetermined detection surface or an object present near the predetermined detection surface without mechanical contact by using an electromagnetic field force or infrared rays. The proximity sensor 142 has a longer lifetime and a higher utilization than a contact sensor.

Examples of the proximity sensor 142 may include a transmission photoelectric sensor, a direct reflective photoelectric sensor, a mirror reflective photoelectric sensor, a high-frequency oscillation proximity sensor, a capacitance proximity sensor, a magnetic proximity sensor, and an infrared proximity sensor.

When the above-described touch screen is a capacitive touch screen, the touch screen is configured to detect proximity of a pointer using a change in an electric field caused by the proximity of the pointer. In this case, the touch screen (the touch sensor) may be classified as a proximity sensor.

For convenience of description, an action in which the pointer is located on the touch screen because the pointer is in close proximity to the touch screen rather than in contact therewith is referred to as a proximity touch, and an action in which the pointer is actually in contact with the touch screen is referred to as a contact touch. A position where the proximity touch is performed with the pointer on the touch screen means a position where the pointer vertically corresponds to the touch screen when the proximity touch is performed with the pointer. However, when the proximity touch and the contact touch need not be described separately, the term "touch" or "touch input" refers to both an input by the proximity touch and an input by the contact touch.

The proximity sensor 142 detects a proximity touch and a proximity touch pattern (e.g., a proximity touch distance, a proximity touch direction, a proximity touch speed, a proximity touch time, a proximity touch position, a proximity touch movement state, etc.). Information corresponding to the detected proximity touch and proximity touch pattern may be output to the touch screen.

The sound output module 152 may output audio data received from the wireless communication unit 110 or stored in the memory 160 in a call signal receiving mode, a call mode, a recording mode, a voice recognition mode, a broadcast reception mode, etc. The sound output module 152 outputs a sound signal (e.g., a call signal reception sound, a message reception sound, etc.) associated with a function performed by the wearable electronic device 100. The sound output module 152 may include a receiver, a speaker, a buzzer, etc.

The alarm unit 153 outputs a signal for announcing an occurrence of an event associated with the wearable electronic device 100. Examples of the event occurring in the electronic device include call reception, message reception, key signal input, touch input, or the like. The alarm unit 153 may output a signal for announcing an occurrence of an event in forms other than a video signal or an audio signal, for example, by way of vibration. The video signal or the audio signal may be output via the display 151 or the sound output module 152.

The haptic module 154 generates various tactile effects that may be sensed by a user. Vibration may be representative of the tactile effects generated by the haptic module 154. The vibration generated by the haptic module 154 is controllable in intensity and pattern. For example, different vibrations may be output in combination or in sequence.

The haptic module 154 may generate various tactile effects such as an effect of a stimulation through arrangement of pins vertically moving against a contact skin surface, an effect of a stimulation caused through an expulsion/suction power of air via an expulsion/suction hole, an effect of a stimulation caused by rubbing a skin surface, an effect of a stimulation through contact with an electrode, an effect of a stimulation using an electrostatic force, and an effect of a representation of a warm or cold sense using an endothermic or exothermic device.

The haptic module 154 may be configured to transfer the tactile effect through direct contact as well as to enable a user to sense a tactile effect through a muscle sense of a finger, an arm, or the like of the user. Two or more haptic modules 154 may be provided according to an implemented aspect of the wearable electronic device 100.

The memory 160 may store a program for operating the control unit 180 and may temporarily store input/output (I/O) data (e.g., a phonebook, a message, a still image, and a video). The memory 160 may store data on various patterns of vibration and sound that are output when a touch input is applied to the touch screen.

The memory 160 may include at least one of a flash memory type, a hard disk type, a multimedia card micro type, a card type memory (e.g., secure digital (SD) or extreme digital (XD) memory), a random access memory (RAM), a static random access memory (SRAM), a read-only memory (ROM), an electrically erasable programmable read-only memory (EEPROM), and a programmable read-only memory (PROM), a magnetic memory, a magnetic disk, and an optical disk. The wearable electronic device 100 may operate in association with a web storage for performing a storage function of the memory 160 on the Internet.

The interface unit 170 serves as a passage leading to all external devices connected to the wearable electronic device 100. The interface unit 170 receives data or power from the external devices, and then transfers the data or power to elements of the electronic device 100 or transmits data to the external devices. For example, the interface unit 170 may include a wired/wireless headset port, an external charger port, a wired/wireless data port, a memory card port, a portion for coupling to a device having an identity module, an audio I/O port, a video I/O port, an earphone port, and/or the like.

The identity module is a chip for storing various kinds of information for authenticating a use authority of the wearable electronic device 100 and may include a User Identity Module (UIM), a Subscriber Identity Module (SIM), a Universal Subscriber Identity Module (USIM) and/or the like. A device having the identity module (hereinafter referred to as an "identity device") may be manufactured as a smart card. The identity device may be connectible to the wearable electronic device 100 via a port.

When the wearable electronic device 100 is connected to an external cradle, the interface unit 170 may become a passage for supplying the wearable electronic device 100 with power from the cradle or a passage for delivering various command signals input by the user from the cradle to the wearable electronic device 100. Each of the various command signals input from the cradle or the power may operate as a signal enabling the wearable electronic device 100 to recognize that it is correctly loaded in the cradle.

The control unit 180 typically controls overall operations of the electronic device. For example, the control unit 180 performs control and processing associated with voice calls, data communications, video calls, etc. The control unit 180 may include a multimedia module 181 for multimedia playback. The multimedia module 181 may be implemented as a part of the control unit 180 or may be implemented as a separate component.

The power supply unit 190 is supplied with internal power and/or external power by control of the control unit 180 and supplies power required to operate each component.

Various embodiments described herein may be implemented in a medium that is readable by a computer or the like using, for example, software, hardware, or some combination thereof.

For hardware implementation, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and other electronic units designed to perform functions described herein. In some cases, the embodiments may be implemented by the control unit 180.

For software implementation, embodiments such as procedures and functions may be implemented with separate software modules, each of which may perform at least one function or operation described herein. A software code may be implemented by a software application written in any suitable programming language. Also, the software code may be stored in the memory 160 and executed by the control unit 180.

Figure 2:
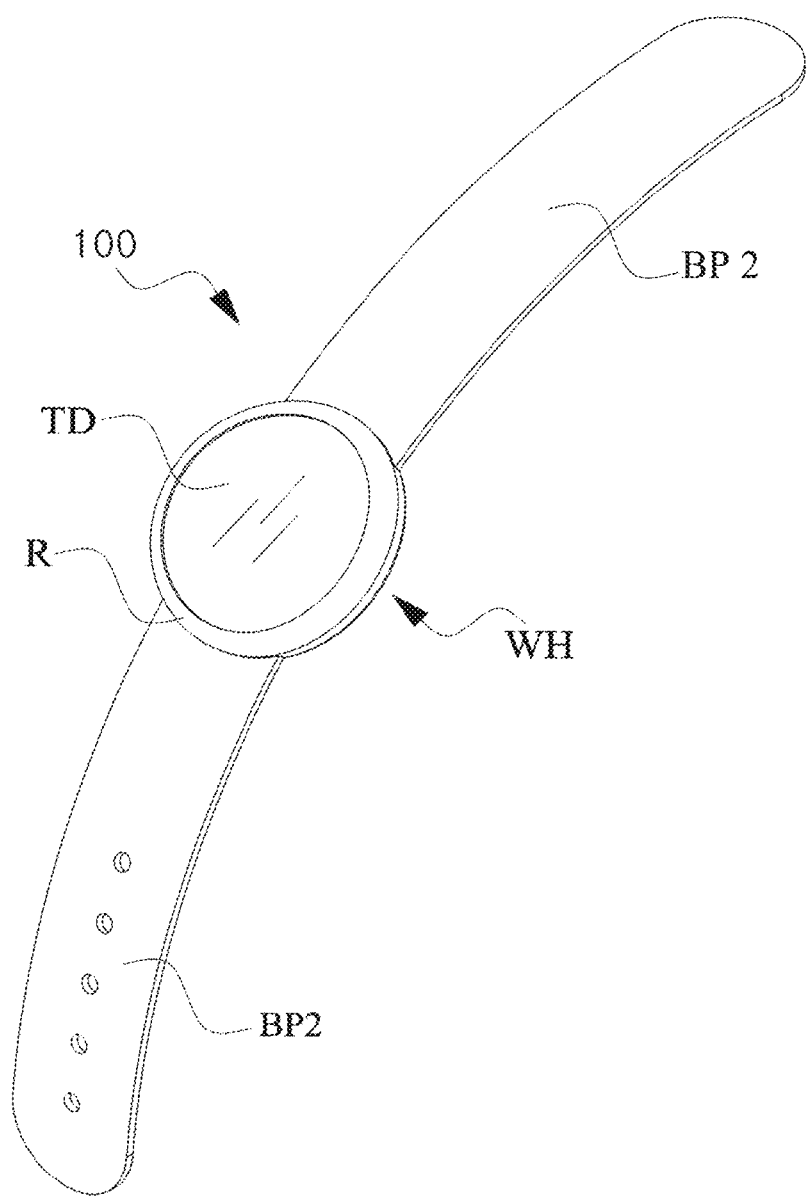
FIG. 2 is a schematic perspective view illustrating an external appearance of a wearable electronic device according to embodiments of the present invention.

FIG. 2 is a schematic perspective view illustrating an external appearance of a wearable electronic device according to embodiments of the present invention.

Referring to FIG. 2, the wearable electronic device 100 according to the described technology may include a watch head WH, a first band portion BP1 connected at a first side of the watch head WH, and a second band portion BP2 connected at a second side of the watch head WH.

The watch head WH may include the various kinds of components of the wearable electronic device 100 according to the described technology, which were described with reference to FIG. 1. In particular, referring to FIG. 2, the watch head WH may include a touch display portion TD and a rim portion R. The touch display portion TD may include the display 151 that was described with reference to FIG. 1, and the rim portion R may include the user input unit 130 that was described with reference to FIG. 1. Particularly, the rim portion R may include a touch pad or the force direction sensor 131. The touch pad or the force direction sensor 131 may be included in portions (e.g., the first and second band portions) other than the rim portion R of the wearable electronic device 100 according to the described technology. However, for convenience of description, the touch pad or the force direction sensor 131 provided in the rim portion R is referred to as a rim touch sensor.

The first band portion BP1 and the second band portion BP2 function as means for enabling the wearable electronic device 100 to be worn on a part of a user's body (e.g., a wrist, a forearm, an ankle, a thigh, etc.).

For example, one end of the first band portion BP1 (i.e., the other end of the one end connected to the watch head WH) and one end of the second band portion BP2 (i.e., the other end of the one end connected with the watch head WH) may be connected to each other and fixed at a portion of the user's body.

According to some embodiments, the first band portion BP1 and the second band portion BP2 may be integrally configured instead of being configured to be removable as shown in FIG. 2. In this case, it is preferable that the first band portion BP1 and the second band portion BP2 be made of an elastic material.

The band portion BP1 or BP2 may include the user input unit 130 that was described with reference to FIG. 1. Particularly, the band portion BP1 or BP2 may include the touch pad or the force direction sensor 131. The touch pad or the force direction sensor 131 may be included in portions (e.g., the rim portion) other than the band portion BP1 or BP2 of the wearable electronic device 100 according to the described technology. However, for convenience of description, the touch pad or the force direction sensor 131 provided in the band portion BP1 or BP2 is referred to as a band touch sensor.

<Force Direction Sensor>

The force direction sensor 131 that may be applied to the electronic device 100 according to some embodiments of the present invention will be described below with reference to FIG. 3.

As described above, the term "force direction" used herein includes a shear force acting in a direction parallel to a touch surface that cannot be detected by conventional touch sensors. That is, when an external object touches and/or contacts the force direction sensor 131, the force direction sensor 131 may even detect a shear force generated on the touch surface by the touch and/or contact.

The force direction sensor 131 according to the described technology may include a sensor array SA composed of unit sensors for sensing a force direction.

For example, the sensor array SA may be arranged in a region where a force direction is to be sensed. when a touch and/or a contact is generated on the region where the sensor array SA is arranged, the force direction sensor 131 may detect a force direction of the touch and/or contact.

That is, the sensor array SA may be arranged in the region where the force direction of the touch and/or contact is to be sensed. For example, when the wearable electronic device 100 includes a touch screen, the wearable electronic device 100 may be used for operation of the wearable electronic device 100 by combining a conventional touch input and a force direction of the touch. In this case, the sensor array SA may be arranged in a region of the display 151 (i.e., a touch screen region) of the wearable electronic device 100. Thus, touch input information that is obtainable from the touch screen and force direction information that is obtained from the force direction sensor 131, which is an aggregate of the sensor array SA, may be combined by the wearable electronic device 100 and effectively used to operate the wearable electronic device 100.

As another example, the sensor array SA may be disposed on the rim portion R of the wearable electronic device 100. Accordingly, the wearable electronic device 100 may detect a force direction of a touch and/or contact on the rim portion R, and detected information thereon may be effectively used to operate the wearable electronic device 100.

As still another example, the sensor array SA may be disposed on the band portion BP1 or BP2 of the wearable electronic device 100. Accordingly, the wearable electronic device 100 may detect a force direction of a touch and/or contact on the band portion BP1 or BP2, and detected information thereon may be effectively used to operate the wearable electronic device 100.

The force direction sensor 131 may detect a variety of information regarding a touch and/or contact on a force direction detection area FDDA determined by a region in which the sensor array SA is provided. For example, the force direction sensor 131 may detect one or more of a presence of a contact of an external object OB on the force direction detection area, a position of the contact, and a force intensity (i.e., a force intensity of a touch and/or contact) and a force direction (i.e., a force direction of the touch and/or contact) when the contact occurs.

Each sensor of the sensor array SA included in the force direction sensor 131 may detect one or more of a presence of a contact of the external object OB, a position of the contact, and a force intensity and a force direction when the contact occurs.

Information corresponding to one or more of a presence of a contact at one point of a touch region, a position of the contact, and a force intensity and a force direction when the contact occurs, which are detected by the force direction sensor 131, may be transferred to the control unit 180 and/or a separate touch event processing module (drawing not shown).

The control unit 180 and/or the touch event processing module may set a touch area having a certain size with respect to a point of the force direction detection area at which a touch and/or a contact was detected, compare force intensities at multiple sending points that are present in the touch area (e.g., points at which unit sensors constituting the sensor array SA are arranged), and determine a force direction applied to the point. The determination of the force direction by the touch event processing module may be performed as illustrated in FIG. 3. FIG. 3 is a schematic diagram showing an example of a process of detecting a force direction using a force intensity according to an embodiment of the present invention.

Referring to FIG. 3, the control unit 180 and/or the touch event processing module may determine a force direction according to a distribution of force intensities detected at multiple sensing points included in a touch area TA. In particular, the control unit 180 may determine a direction of a sensing point at which the greatest force intensity is detected as the force direction based on a center O of the touch area TA.

For example, when a touch and/or contact of the external object OB at one point of the force direction detection area FDDA is achieved, the touch area TA may be set or extracted with a predetermined size based on a point at which the external object OB comes into contact with a surface of the force direction detection area FDDA. The touch area TA may be set to have a predetermined size range based on a specific coordinate (e.g., a center coordinate) of the one point or may be set by connecting multiple adjacent sensing points at which contacts of a user are detected among the multiple sensing points included in the force direction detection area FDDA.

In addition, the control unit 180 and/or the touch event processing module detects force intensities F1 to F5 at the multiple sensing points in the set or extracted touch area TA. A greater force intensity may be detected at a sensing point in a direction in which the user applies force in the touch area TA.

The electronic device 100 according to the described technology detects a force direction of a sensing point having the greatest force intensity among the multiple sensing points around the center point of the touch area TA as a force direction FD of the touch area TA.

Accordingly, when the external object OB touches and/or comes into contact with the force direction detection area FDDA, the electronic device 100 may use the force direction sensor 131 to detect a position of the touch and/or contact and also a direction in which a shear force is applied from the position of the touch and/or contact.

A force intensity of the sensing point having the greatest force intensity among the multiple sensing points detected around the center point of the touch area TA may be used to measure an intensity of the shear force, which will be described below. For example, the force intensity of the sensing point having the greatest force intensity may be regarded as the intensity of the shear force. As another example, a difference in force intensity between the sensing point having the greatest force intensity and a sensing point having the smallest force intensity may be regarded as an intensity of the shear force at a corresponding point.

Various embodiments of the wearable electronic device according to the described technology will be described below by using the wearable electronic device 100 that was described with reference to FIGS. 1 to 3.

Hereinafter, for convenience of description, embodiments of a method of controlling a wearable electronic device according to the present invention will be described by using the wearable electronic device 100 that was described with reference to FIGS. 1 to 3. However, the method of controlling an electronic device according to the described technology is not restrictively applied only to the wearable electronic device 100 that was described with reference to FIGS. 1 to 3. That is, the method of controlling a wearable electronic device according to the described technology may be applied to a wearable electronic device that does not have at least some of the elements of the wearable electronic device 100 that was described with reference to FIGS. 1 to 3. On the other hand, the method of controlling a wearable electronic device according to the described technology may also be applied to a wearable electronic device that has more elements than the wearable electronic device 100.

Furthermore, in various embodiments of the method of controlling a wearable electronic device according to the described technology, the method of controlling a wearable electronic device according to the described technology may even be applied to a wearable electronic device that senses a force direction in a manner other than the manner that was described with reference to FIG. 3. That is, the method of controlling a wearable electronic device according to the described technology, which will be described below, may be applied to an electronic device having a sensor that may sense a force direction of a touch and/or contact by using a method other than the method of sensing a shear force on a touch surface, which was described with reference to FIG. 3.

<Operation of Wearable Electronic Device—Method of Controlling Wearable Electronic Device>

An operation of a wearable electronic device according various embodiments of the present invention (i.e., a method of controlling a wearable electronic device) will be described below.

Here, the terms "rim touch" and "display touch" will be described separately. The term "rim touch" refers to a touch input that input is detected by a rim touch sensor disposed on a rim portion, which is separate from a touch display, and the term "display touch" refers to a touch input that is an input detected by a touch sensor included in a touch display.

It is preferable that the touch display and the rim touch sensor provided in the rim portion be completely distinct from each other to achieve the objective of the described technology. Accordingly, the touch display and the rim touch sensor will be completely distinct in the following description. However, when an electronic device is designed by dividing the touch display into a region (a first region) logically capable of touch input and information display simultaneously, and a region (a second region) capable of touch input but not display information, the first region may correspond to a touch display portion of the described technology and the second region may correspond to a rim portion of the described technology.

First Embodiment

Figure 4:
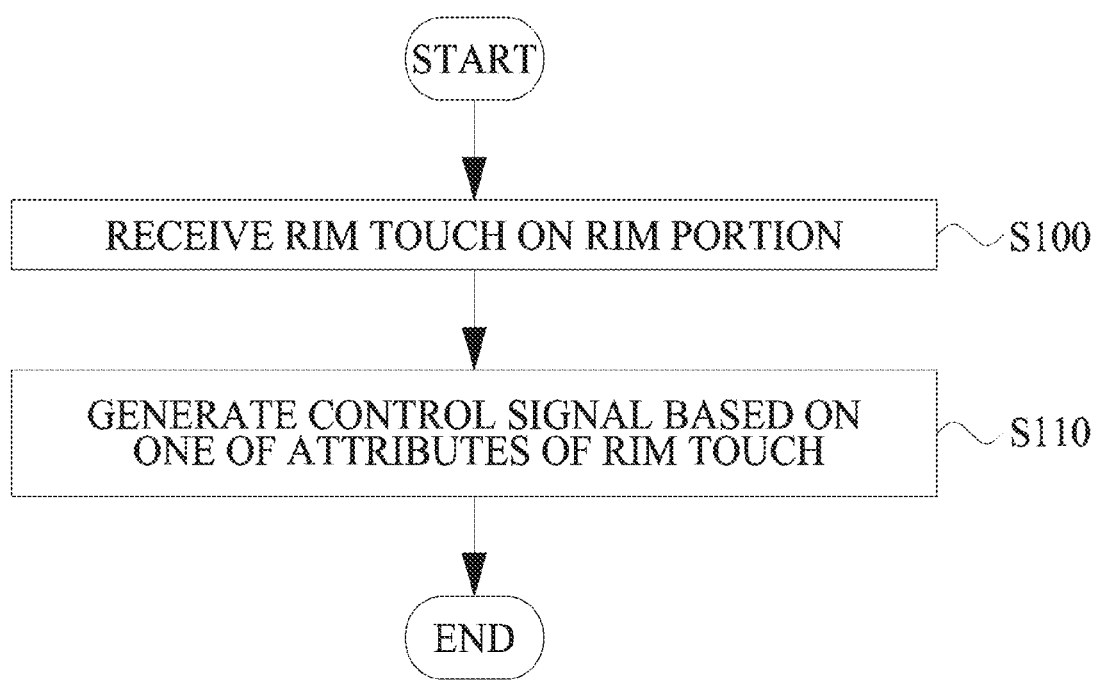
FIG. 4 is a flowchart illustrating an operation of a wearable electronic device according to a first embodiment of the present invention.

FIG. 4 is a flowchart illustrating an operation of a wearable electronic device according to a first embodiment of the present invention. FIGS. 5 to 9 are diagrams illustrating the operation of the wearable electronic device according to the first embodiment of the present invention.

Referring to FIG. 4, a wearable electronic device 100 according to the first embodiment of the present invention may receive a rim touch through a rim touch sensor provided on a rim portion R surrounding a touch display portion TD(S100) and may generate a control signal for controlling the wearable electronic device 100 based on at least one of attributes of the rim touch (S110).

The rim touch attributes may refer to at least one or a combination of a rim touch position, a rim touch duration time, a rim touch rotating direction, a rim touch pressure, and a rim touch shear force direction.

Figure 5:
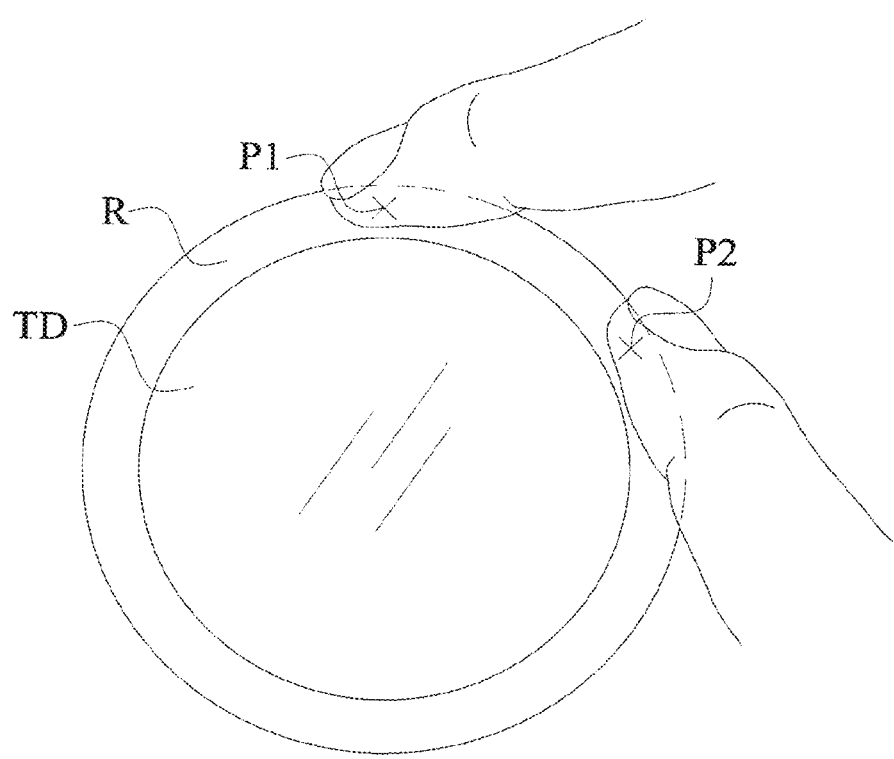
FIGS. 5, 6, 7, 8A, 8B, 9A and 9B are diagrams illustrating the operation of the wearable electronic device according to the first embodiment of the present invention.

The rim touch position refers to a point at which a rim touch of a user is input on the rim portion R. In this case, as shown in FIG. 5, when a first rim touch is input at a first position P1 and a second rim touch is input at a second position P2, a position attribute of the first rim touch may be different from a position attribute of the second rim touch.

Figure 6:
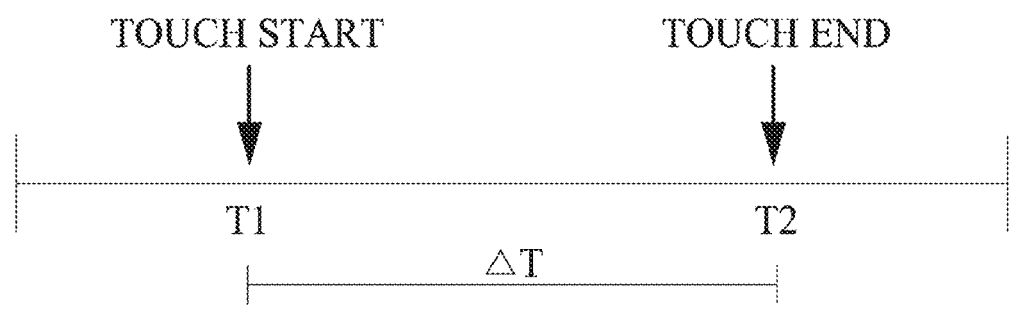

The rim touch duration time refers to a duration time for which a rim touch of a user on the rim portion R is maintained. For example, as shown in FIG. 6, when the rim touch starts at a first time point T1 and ends at a second time point T2, the rim touch duration time may be defied as T2-T1.

Figure 7:
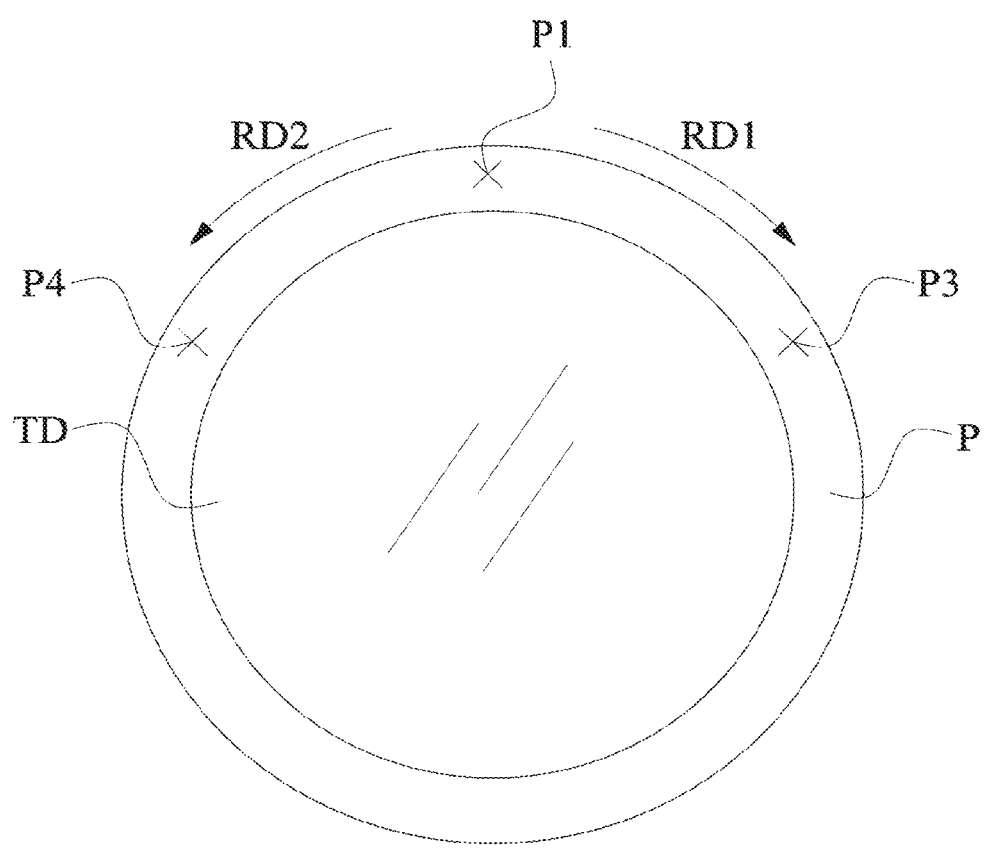

The rim touch rotating direction refers to a moving direction at a time at which a position of the rim touch is changed in the rim portion R while the rim touch is maintained. In this specification, the rim touch rotating direction is largely classified into a clockwise direction and a counterclockwise direction. For example, as shown in FIG. 7, it is assumed that the rim touch rotating direction is the clockwise direction when a rim touch starts at the first position P1 and moves to a third position P3 along a first tracking path RD1, and that the rim touch rotating direction is the counterclockwise direction when a rim touch starts at the first position p1 and moves to a fourth position P4 along a second tracking path RD2.

The rim touch pressure is an attribute that may be defined when the rim touch sensor is configured to sense a touch pressure like the force direction sensor 131 that was described with reference to FIG. 3, and refers to a force intensity at a rim touch position in a direction vertical to a touch surface.

The rim touch shear force direction is an attribute that may be defined when the rim touch sensor is configured to sense a shear force on a touch surface like the force direction sensor 131 that was described with reference to FIG. 3, and refers to a direction of a shear force measured at a rim touch position while a rim touch is maintained at one point, as described above with reference to FIG. 3.

The rim touch attributes may include various attributes other than the above-described rim touch position, rim touch duration time, rim touch rotating direction, rim touch pressure, and rim touch shear force direction. For example, a rim touch start position, a rim touch end position, a rim touch start time point, a rim touch end time point, a rim touch shear force intensity, or the like may be defined as the rim touch attributes.

According to the first embodiment of the present invention, the wearable electronic device 100 may select an operation or function corresponding to at least one of the attributes of the rim touch described above.

The wearable electronic device 100 may prestore the rim touch attributes and their corresponding operations or functions in the memory 160.

For example, the wearable electronic device 100 may divide the rim portion R into predetermined sections and store an operation or function corresponding to each of the sections in the memory 160. That is, the wearable electronic device 100 may prestore a function of performing a first operation when the position of the rim touch is included in a region from the 12 o'clock position to the 3 o'clock position in the memory. Similarly, the wearable electronic device 100 may prestore different functions corresponding to a region from the 3 o'clock position to the 6 o'clock position, a region from the 6 o'clock position to the 9 o'clock position, and a region from the 9 o'clock position to the 12 o'clock position. In this case, the wearable electronic device 100 may confirm an attribute of a position of a received rim touch, determine which region the position of the rim touch belongs to, and select an operation or function corresponding to the region.

As another example, the wearable electronic device 100 may divisionally set predetermined time periods and store an operation or function corresponding to each of the time periods in the memory 160. That is, the wearable electronic device 100 may divisionally set predetermined time periods such as a time period from 0 seconds to 1 second, a time period from 1 second to 2 seconds, a time period from 2 seconds to 3 seconds, etc., and may set a different operation or function corresponding to each of the time periods. In this case, the wearable electronic device 100 may confirm an attribute of a duration time of a received rim touch, determine which time period the duration time of the rim touch belongs to, and select an operation or function corresponding to the time period.

As still another example, the wearable electronic device 100 may store an operation or function corresponding to a predetermined rotating direction (i.e., the clockwise direction and the counterclockwise direction) in the memory 160. Accordingly, the wearable electronic device 100 may confirm an attribute of a rotating direction of a received rim touch and select an operation or function corresponding to the confirmed rotating direction of the rim touch.

As still another example, the wearable electronic device 100 may divisionally set predetermined pressure levels and store an operation or function corresponding to each of the pressure levels in the memory 160. Similar to the above description, the wearable electronic device 100 may confirm an attribute of a pressure of a rim touch and select an operation or function corresponding to a level which the confirmed pressure belongs to.

As still another example, the wearable electronic device 100 may store an operation or function corresponding to each predetermined shear force direction in the memory 160. The wearable electronic device 100 may confirm an attribute of a shear force direction of a rim touch and select an operation or function corresponding to the confirmed shear force direction. The shear force direction may include the clockwise direction and the counterclockwise direction. Alternatively, the shear force direction may include an inward direction from the rim portion R toward the touch display portion TD and an outward direction away from the touch display portion TD.

The wearable electronic device 100 may use only one of the rim touch attributes to select a corresponding operation or function, and may also use two of the rim touch attributes to select corresponding operations or functions.

For example, the wearable electronic device 100 may use two attributes of the rim touch, that is the position and the rotating direction. In this case, on the assumption that a first rim touch has attributes of a first position and the clockwise direction and a second rim touch has attributes of a first position and the counterclockwise direction, an operation or function selected by the first rim touch may be different from an operation or function selected by the second rim touch. That is, when rim touches are input at the same position, but different rotating direction attributes, the rim touches may correspond to different operations or functions. When corresponding operations or functions are selected in consideration of two rim touch attributes as described above, the number of divided position sections is N (N=4 in the above example), and the number of predetermined rotating directions is M (M=2 in the above example), a total of N*M operations or functions may correspond to rim touches.

For convenience of description, an example in which rim touch attributes to be used are a position and a rotating direction has been described. However, it should be obvious to a person skilled in the art that two other attributes may be selected and utilized similarly to the above description.

Also, similarly to the above description, the wearable electronic device 100 may use three or more of the rim touch attributes to select corresponding operations or functions.

As described above, the wearable electronic device 100 may select an operation or function based on a received rim touch, and then generate a control signal for executing a selected operation or function. Accordingly, the wearable electronic device 100 may perform an operation or function corresponding to the rim touch.

As described above, the wearable electronic device 100 according to the first embodiment of the present invention may have various types of expandability and also provide a user with a rim touch user interface that is convenient to use. In particular, the rim touch interface provided by the wearable electronic device 100 according to the first embodiment of the present invention may enable a user to enter a desired input without obstructing the users field of view to a display that provides information to the user, thereby providing the user with much enhanced convenience in comparison with a conventional method in which a user performs a desired input using a touch input applied to a touch display.

The wearable electronic device 100 may further receive a display touch through the touch display and generate a control signal for controlling the wearable electronic device based on the display touch and at least one of the rim touch attributes.

An example of generating a control signal for controlling the wearable electronic device based on a touch display and at least one of the rim touch attributes will be described with reference to FIGS. 8A and 8B.

The wearable electronic device 100 may select at least one item displayed through the touch display portion TD based on a received display touch, select an additional item function to be performed on the selected at least one item based on at least one of the rim touch attributes, and generate a control signal corresponding to the selected additional item function.

In this case, the item may include an application execution icon, a file icon, a widget, or the like.

The additional item function may include additional functions that may be executed on the item, for example, an execution, a movement, a copy, and a deletion of the item.

Figure 8A:
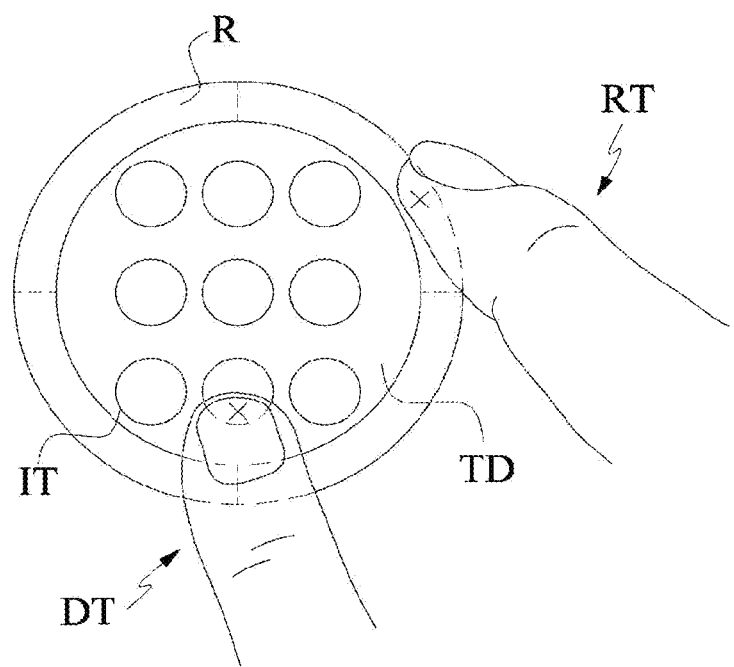
Figure 8B:
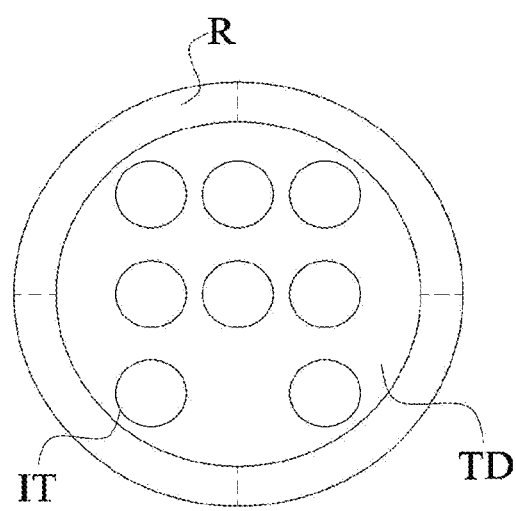

Referring to FIG. 8A, it is shown that one of the plurality of items IT displayed on the touch display portion TD is selected by a display touch DT, and a rim touch RT is input to any one section of the rim portion R that is logically divided into four sections. In this case, when an additional item function corresponding to the section to which an input position of the rim touch RT belongs is "deletion," the item selected by the display touch DT may be deleted as shown in FIG. 8B.

Another example of generating a control signal for controlling the wearable electronic device based on a touch display and at least one of the rim touch attributes will be described with reference to FIGS. 9A and 9B.

The wearable electronic device 100 may select a screen to be displayed through the touch display based on a display touch, select an additional screen function to be performed on the selected screen based on at least one of the rim touch attributes, and then generate a control signal corresponding to the selected additional screen function.

The additional screen function may include additional functions to be executed on the screen, for example, a capture, an enlargement, and a reduction of the screen.

Figure 9A:
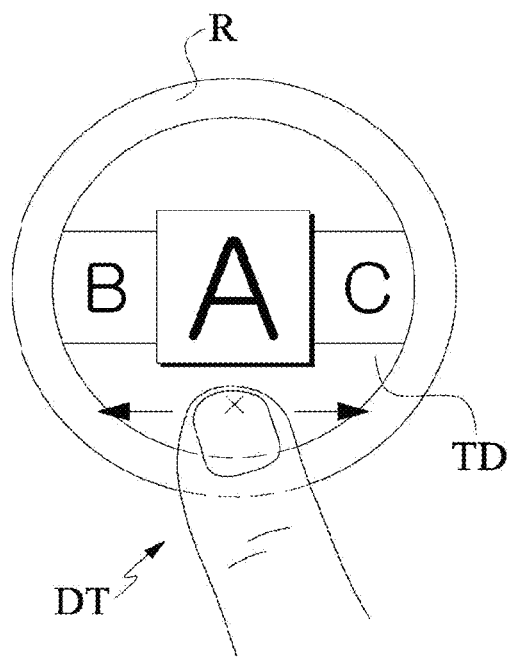
Figure 9B:
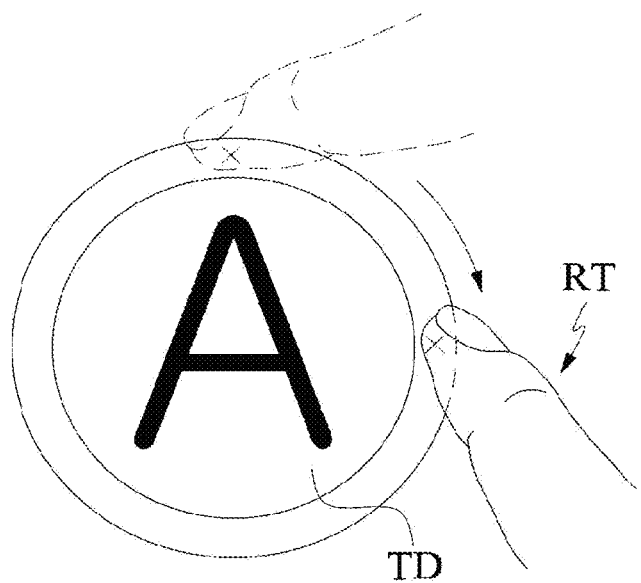

Referring to FIG. 9A, a screen to be displayed on the touch display portion TD may be selected by the display touch DT. As shown in FIG. 9B, when the rim touch RT having a rotating direction attribute of the clockwise direction is input to the screen selected by the display touch DT, the selected screen may be enlarged.

Similarly to the above description, the wearable electronic device 100 may select a main function based on the display touch, select one of a plurality of sub-functions of the selected main function, and then generate a control signal corresponding to the selected sub-function.

In the above-described examples, an item selection, a screen selection, a main function selection, etc. are performed by the display touch, and additional functions of the selections are executed by the rim touch. However, these are merely examples. Alternatively, an item selection, a screen selection, a main function selection, etc. may be performed by the rim touch, and additional functions of the selections may be executed by the display touch.

When the rim touch user interface provided by the wearable electronic device 100 according to the first embodiment of the present invention is used together with a touch input applied to a conventional touch screen as described above, it is possible to provide a user with better immediacy and greater convenience.

Second Embodiment

Figure 10:
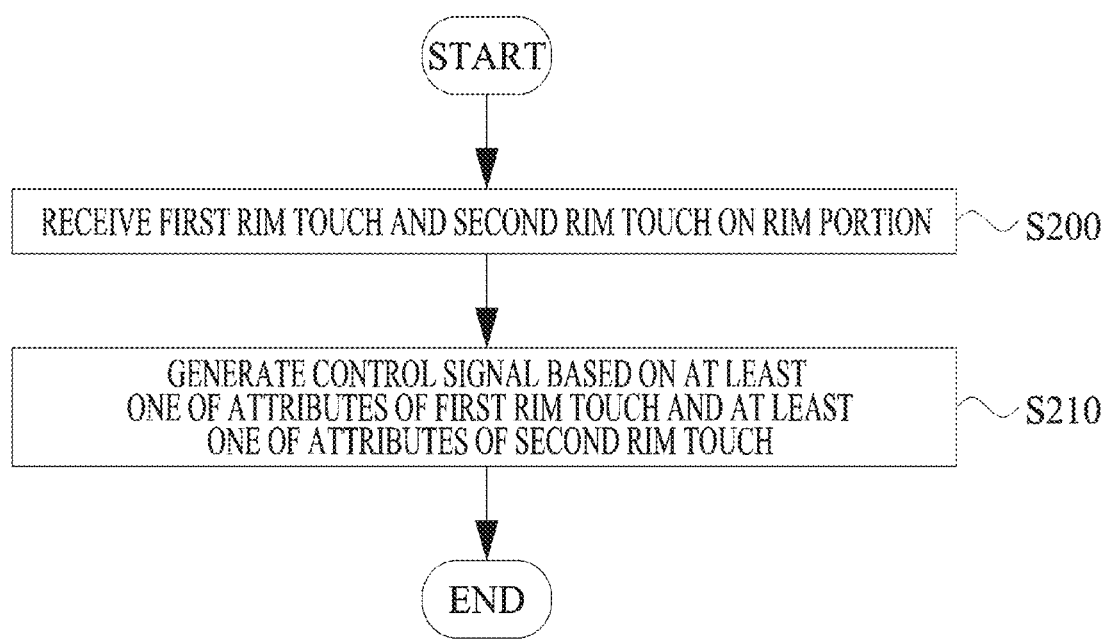
FIG. 10 is a flowchart illustrating an operation of a wearable electronic device according to a second embodiment of the present invention.
Figure 11A:
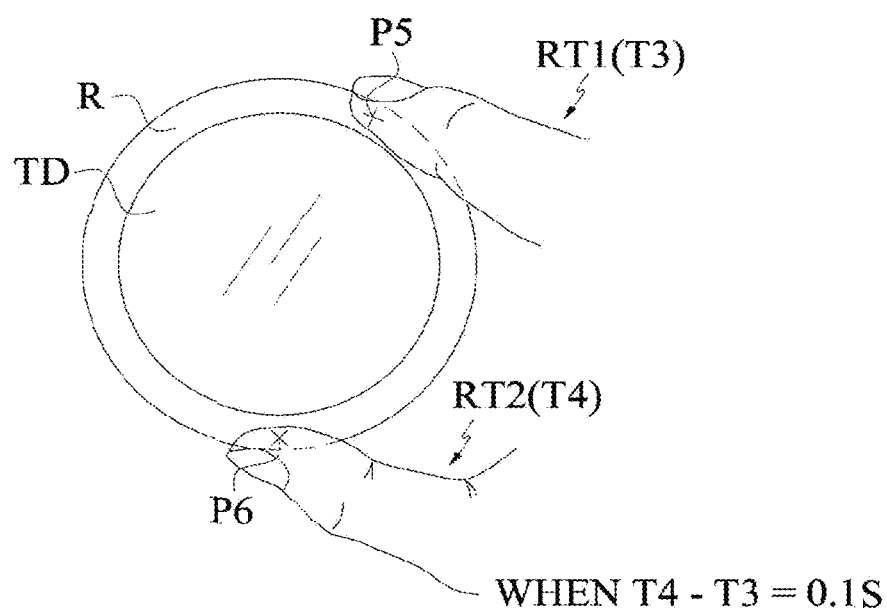
FIGS. 11A and 11B are diagrams illustrating the operation of the wearable electronic device according to the second embodiment of the present invention.
Figure 11B:
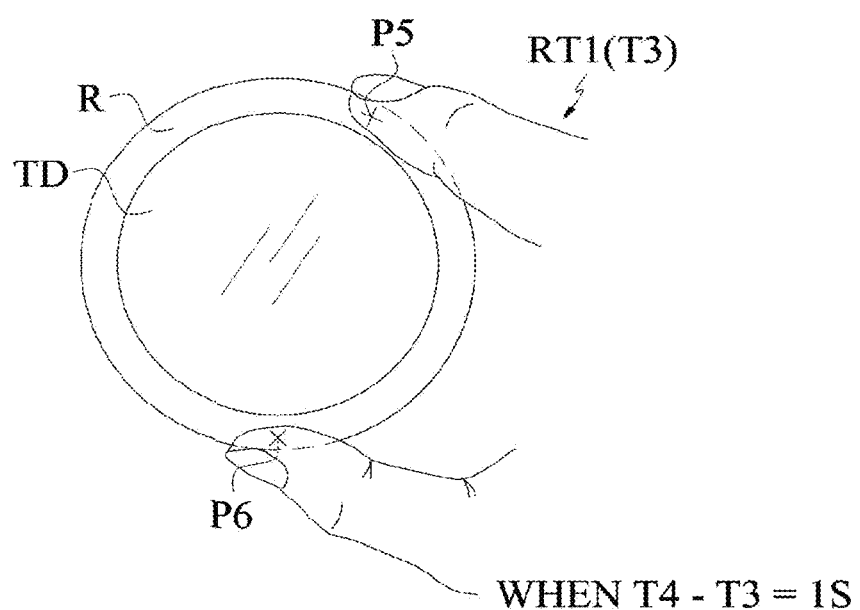

FIG. 10 is a flowchart illustrating an operation of a wearable electronic device according to a second embodiment of the present invention. Also, FIGS. 11A and 11B are diagrams illustrating the operation of the wearable electronic device according to the second embodiment of the present invention.

Referring to FIG. 10, a wearable electronic device 100 according to the second embodiment of the present invention may receive a first rim touch and a second rim touch on a rim portion R through a rim touch sensor provided in the rim portion R surrounding a touch display portion TD (S200), and may generate a control signal for controlling the wearable electronic device 100 based on at least one of attributes of the first rim touch and at least one of attributes of the second rim touch (S210).

The attributes of the first rim touch and the attributes of the second rim touch were described in detail when the first embodiment of the present invention was described, and thus a detail description thereof will be omitted.

The wearable electronic device 100 may confirm at least one of the attributes of the first rim touch and at least one of the attributes of the second rim touch. The wearable electronic device 100 may analyze a relationship between the confirmed at least one attribute of the first rim touch and the determined at least one attribute of the second rim touch, confirm a corresponding operation or function stored in the memory 160 according to the analyzed relationship, and generate a control signal needed to perform the corresponding operation or function (S210).

The wearable electronic device 100 may determine a relationship between an input time point attribute of the first rim touch and an input time point attribute of the second rim touch. The first rim touch and the second rim touch may be input at substantially the same time. Alternatively, the first rim touch and the second rim touch may be input in sequence.

When the first rim touch is input at a third time point T3, the second rim touch is input at a fourth time point T4 (T4>T3), and a difference between the input time point of the first rim touch and the input time point of the second rim touch is actually within a predetermined short time range (e.g., the difference between the two input time points is 0.1 second, 0.2 second, or 0.3 second), the wearable electronic device 100 may determine that the first rim touch and the second rim touch are input at substantially the same time. On the other hand, when the difference between the input time point of the first rim touch and the input time point of the second rim touch is beyond the predetermined short time range (e.g., the difference between the two input time points is 0.8 second, 1 second, or 1.2 second), the wearable electronic device 100 may determine that the first rim touch and the second rim touch are input in sequence instead of at the same time. On the other hand, when the difference between the input time point of the first rim touch and the input time point of the second rim touch is beyond a predetermined long time range (e.g., the difference between the two input time points is 2.5 seconds, 3 seconds, or 4 seconds), the wearable electronic device 100 may determine that the first rim touch and the second rim touch are unrelated to each other.

When it is determined that the first rim touch and the second rim touch are input at the same time, the wearable electronic device 100 may enter a first rim multi-touch analysis mode for analyzing the first rim touch and the second rim touch.

When it is determined that the first rim touch and the second rim touch are input in sequence, the wearable electronic device 100 may enter a second rim multi-touch analysis mode for analyzing the first rim touch and the second rim touch.

When it is determined that the first rim touch and the second rim touch are unrelated to each other, the wearable electronic device 100 may perform an operation corresponding to the first rim touch as described in the first embodiment of the present invention and also perform an operation corresponding to the second rim touch as described in the second embodiment of the present invention. That is, the wearable electronic device 100 may independently analyze the first rim touch and the second rim touch and perform their corresponding operations.

A method of analyzing the first rim touch and the second rim touch or their corresponding operations or functions in the first rim multi-touch analysis mode may be different from a method of analyzing the first rim touch and the second rim touch or their corresponding operations or functions in the second rim multi-touch analysis mode.

For example, referring to FIGS. 11A and 11B, first rim touches RT1 and second rim touches RT2 shown in FIGS. 11A and 11B, except for the relationship of their input time attributes, Are shown to have the same location attribute respectively. That is, the position attributes of the first rim touches RT1 shown in FIGS. 11A and 11B are a fifth position P5, and the position attributes of the second rim touches RT2 shown in FIGS. 11A and 11B are a sixth position P6. However, in a case of FIG. 11A, when a difference between the input time point T3 of the first rim touch RT1 and the input time point T4 of the second rim touch RT2 is 0.1 seconds, the first rim touch RT1 and the second rim touch RT2 are may be determined to have been input at the same time. On the other hand, in a case of FIG. 11B, when a difference in input time between the two rim touches is 1 second, and thus the rim touches may be determined to have been input in sequence. In this case, the wearable electronic device 100 according to the second embodiment of the present invention may perform a first operation through analysis according to the above-described first rim multi-touch analysis mode as shown in FIG. 11A and perform a second operation different from the first operation through analysis according to the above-described second rim multi-touch analysis mode as shown in FIG. 11B.

The wearable electronic device 100 may confirm the position attribute of the first rim touch and the position attribute of the second rim touch.

The wearable electronic device 100 may use absolute values of the confirmed position attributes after confirming the position attribute of the first rim touch and the position attribute of the second rim touch. In this case, the wearable electronic device 100 may form pairs of the absolute values and confirm operations or functions corresponding to the first rim touch and the second rim touch by referring to the memory 160 that stores operations or functions corresponding to the pairs. That is, when a position of a rim touch may be divided into N, the number of position attributes that the first rim touch may have is N, and the number of position attributes that the second rim touch may have is N−1 (because the second rim touch will be input at positions other than the position of the first rim touch), a total of N*(N−1) functions may correspond to the first rim touch and the second rim touch.

The wearable electronic device 100 may use a relative relation between the confirmed position attributes after confirming the position attribute of the first rim touch and the position attribute of the second rim touch. That is, a difference value of each value may be utilized without using absolute values of the position attribute of the first rim touch and the position attribute of the second rim touch. For example, a pair such as (position of first rim touch, position of second rim touch) may be formed. On the assumption of a case in which the pair is (1, 2) and a case in which the pair is (2, 3), different operations corresponding to the cases may be performed when absolute values are used, and the same operation may correspond to the cases when a relative relationship is used because both difference values in the two cases are 1.

The wearable electronic device 100 may confirm a rotational direction attribute of the first rim touch and a rotational direction attribute of the second rim touch. The total number of combinations of the rotational direction attribute of the first rim touch and the rotational direction attribute of the second rim touch is 4, e.g., (clockwise direction, clockwise direction), (counterclockwise direction, counterclockwise direction), (clockwise direction, counterclockwise direction), and (counterclockwise direction, counterclockwise direction). The wearable electronic device 100 according to the second embodiment of the present invention may store different operations corresponding to the four cases in the memory, and may select or execute an operation corresponding to a value of the confirmed rotational direction attribute.

Hereinafter, for convenience, it is assumed that the wearable electronic device 100 according to the described technology is worn on a left wrist, the rim touch by the index finger of the right hand is referred to as the first rim touch and the rim touch by the thumb of the right hand is referred to as the second rim touch. In this case, some examples in which the intuitiveness and convenience of the user are enhanced by considering the rotation properties of the first rim touch and the second rim touch will be described.

For example, when the rotational direction attributes of the rim touches are confirmed as (clockwise direction, clockwise direction), the wearable electronic device 100 may rotate content displayed on a screen in the clockwise direction. Alternatively, in this case, the wearable electronic device 100 may scroll down the content displayed on the screen. Alternatively, in this case, the wearable electronic device 100 may display a screen following a currently displayed screen (e.g., the next page when viewing a document, the next photo when viewing a photo album, etc.) through a display. Alternatively, the wearable electronic device 100 may display a layer following a currently displayed screen layer through the display.

As another example, when the rotational direction attributes of the rim touches are confirmed as (counterclockwise direction, counterclockwise direction), the wearable electronic device 100 may rotate content displayed on a screen in the counterclockwise direction. Alternatively, in this case, the wearable electronic device 100 may scroll up the content displayed on the screen. Alternatively, in this case, the wearable electronic device 100 may display a screen preceding a currently displayed screen (e.g., the previous page when viewing a document, the previous photo when viewing a photo album, etc.) through a display. Alternatively, the wearable electronic device 100 may display a layer preceding a currently displayed screen layer through the display.

As still another example, when the rotational direction attributes of the rim touches are confirmed as (clockwise direction, counterclockwise direction), the wearable electronic device 100 may enlarge content displayed on a screen. Alternatively, in this case, the wearable electronic device 100 may enable a selected object to be moved to the left and displayed on a display. Alternatively, when executing a media player, the wearable electronic device 100 may enable a progressive bar of the media player to be moved to a preceding time.

As still another example, when the rotational direction attributes of the rim touches are confirmed as (counterclockwise direction, clockwise direction), the wearable electronic device 100 may reduce content displayed on a screen. Alternatively, in this case, the wearable electronic device 100 may enable a selected object to be moved to the right and displayed on a display. Alternatively, when executing a media player, the wearable electronic device 100 may enable a progressive bar of the media player to be moved to a following time.

A case in which the absolute values of the rotational direction attributes of the first rim touch and the second rim touch are used has been described. However, a relative relationship may be used instead of the absolute values. For example, the wearable electronic device 100 may determine whether a rotational direction of the first rim touch and a rotational direction of the second rim touch are the same or different, perform a first operation when the rotational directions are the same, and perform a second operation when the rotational directions are different.

The wearable electronic device 100 may confirm a shear force direction attribute of the first rim touch and a shear force direction attribute of the second rim touch. Even when the shear force direction attribute of the first rim touch and the shear force direction attribute of the second rim touch are used, the wearable electronic device 100 may confirm absolute values of the attributes and make the absolute values correspond to functions by using pairs that may be generated therefrom. Furthermore, the wearable electronic device 100 may confirm relative relationships between the absolute values and make the relative relationships correspond to functions by using pairs corresponding thereto. Accordingly, a description of a detailed method of utilizing these will be omitted herein.

The wearable electronic device 100 may use any one of the attributes of the first rim touch and any one of the attributes of the second rim touch to perform their corresponding functions or operations, or may use two or more of the attributes of the first rim touch and two or more of the attributes of the second rim touch to perform their corresponding functions or operations.

For example, when a corresponding function is set in consideration of both a position attribute and a rotational direction attribute among rim touch attributes, even if both the first rim touch and the second rim touch have a clockwise direction attribute, different functions may be corresponded depending on which position the first rim touch and the second rim touch are initially placed.

As described above, the wearable electronic device 100 according to the second embodiment of the present invention may enable a user to perform a touch input to a watch head WH of the wearable electronic device by using a finger of a hand of an arm other than an arm on which the wearable electronic device 100 is worn (e.g., to perform a touch input to the watch head WH by using the right thumb and index finger while the electronic device is worn on the left hand). Unlike in the first embodiment, a user input is entered into the wearable electronic device in a similar way to an action of naturally gripping the watch head WH of the wearable electronic device 100 with two fingers, and thus a user may feel a manipulation sense that is very similar to a manipulation of a general watch. Moreover, a user interface provided by the wearable electronic device 100 according to the second embodiment of the present invention enables a user to enter a user input without obscuring a screen included in the wearable electronic device 100 with his or her finger or the like, and thus it is possible to solve a conventional inconvenience. Also, a wider variety of functions may be correspondingly provided due to the introduction of the concept of the rim multi-touch, and thus expandability is very high.

The wearable electronic device 100 that may provide a user interface using a rim touch disclosed by the described technology may include various other functions.

For example, due to characteristics of a wearable device, an unintended touch on a rim portion may occur. In this case, an algorithm for determining whether a touch input is intended by a user may be employed.

As another example, the wearable device described in the described technology has a touch display portion and a rim portion that are completely distinct from each other. The touch display may be touched although the user intends to apply a touch input to the rim portion while the user applies the touch input. In this case, the touch input applied to the touch display may be an unintended touch input of the user.

In order to prevent such a problem, an algorithm for deactivating the touch display or ignoring a touch input applied to the touch display may be adopted in the wearable device when it is determined that the user's touch input to the rim area has been performed.

Alternatively, a touch input simultaneously applied to the touch display and the rim portion may be utilized as a new user input that is distinct from a touch input applied only to the rim portion or a touch input applied only to the touch display.

Third Embodiment

Figure 12:
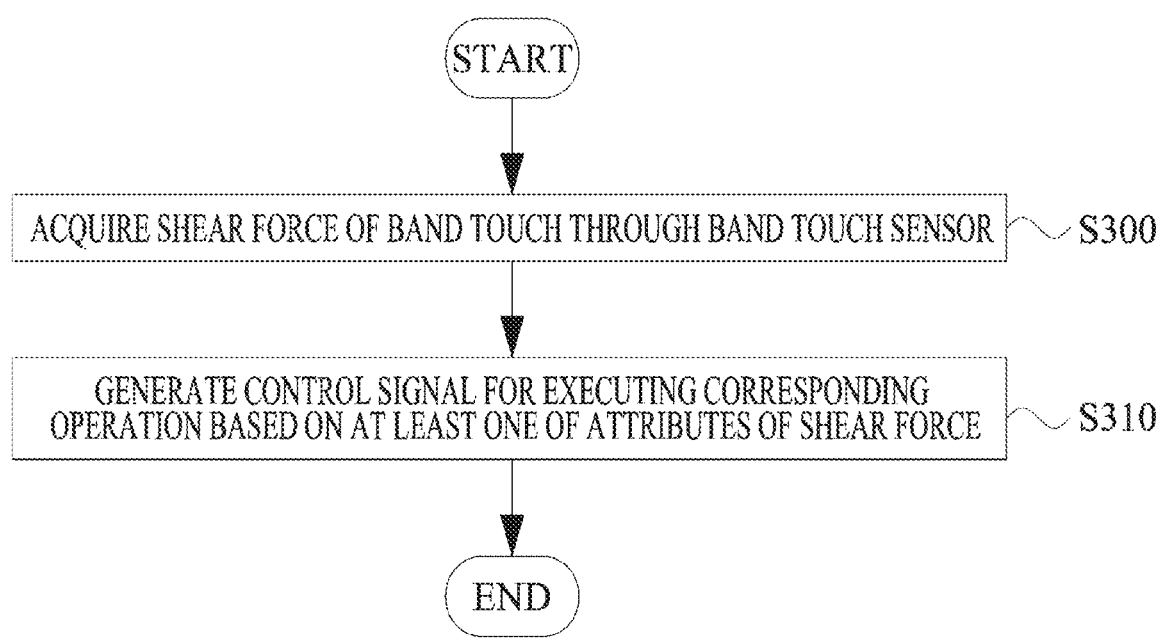
FIG. 12 is a flowchart illustrating an operation of a wearable electronic device according to a third embodiment of the present invention.
Figure 13:
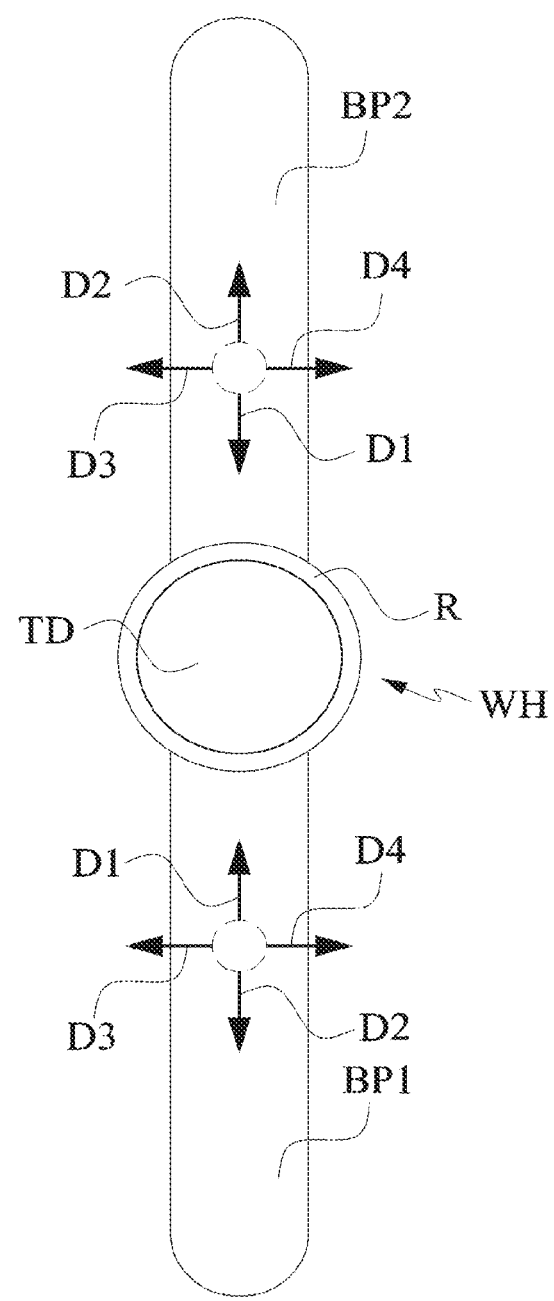
FIGS. 13 and 14 are reference diagrams illustrating the operation of the wearable electronic device according to the third embodiment of the present invention.
Figure 14:
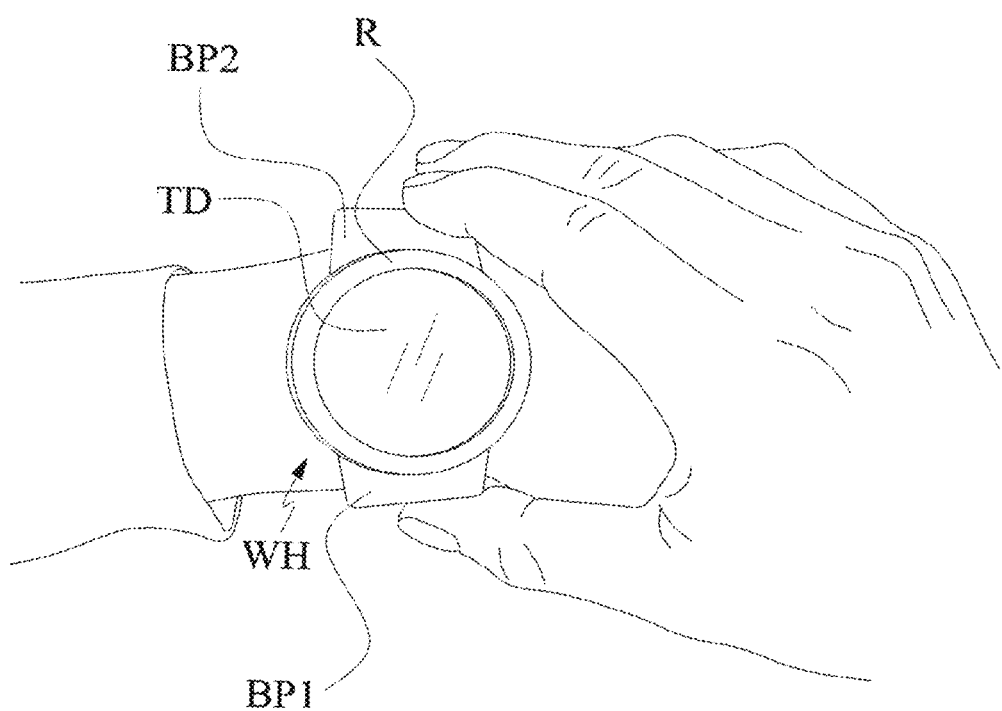

FIG. 12 is a flowchart illustrating an operation of a wearable electronic device according to a third embodiment of the present invention. Also, FIGS. 13 to 14 are reference diagrams illustrating the operation of the wearable electronic device according to the third embodiment of the present invention.

Referring to FIG. 12, a wearable electronic device 100 is disposed on a band portion. The wearable electronic device 100 may acquire a shear force of a band touch through a band touch sensor including a force direction sensor that detects a shear force of a contact applied by an external object to one point of the band portion (S300), and may generate a control signal for executing a corresponding operation based on any one of attributes of the acquired shear force (S310).

The attributes of the shear force may include at least one or a combination of a shear force direction and a shear force intensity.

The shear force direction refers to a direction of a shear force generated at a point (or a region) at which a touch is applied when a touch surface is touched. A method of sensing the direction of the shear force has been described in detail with reference to FIG. 3, and thus a detailed description thereof will be omitted.

The shear force intensity refers to an intensity of a shear force generated at a point at which a touch is applied when a touch surface is touched. A method of sensing the intensity of the shear force has been described in detail with reference to FIG. 3, and thus a detailed description thereof will be omitted.

According to the third embodiment of the present invention, the wearable electronic device 100 may use at least any one of the above-described shear force attributes of the band touch to select an operation or function corresponding to the attribute.

The wearable electronic device 100 may prestore the shear force attributes and their corresponding operations or functions in the memory 160.

For example, the wearable electronic device 100 may divide shear force directions into a direction (a first direction D1) toward a watch head WH in a length direction of the band, a direction (a second direction D2) away from the watch head WH in the length direction of the band, a direction (a third direction D3) toward the left elbow of a user in a width direction of the band when it is assumed that the wearable device 100 is worn on his or her left wrist, and a direction (a fourth direction D4) toward a hand of the user in the width direction of the band when it is assumed that the wearable device 100 is worn on the wrist, and may store an operation or function corresponding to each of the directions in the memory 160 (see FIG. 13). It should be appreciated that the definition and use of operations corresponding to the four directions is not limiting and operations corresponding to two or six directions may be defined.

In this case, while a position of a touch input is fixed, the wearable electronic device 100 acquires a direction of a shear force at the position and selects a function corresponding to the direction. Accordingly, when an area to which a touch input of the user is applicable (e.g., an area of a touch pad or an area of a touch screen) is small, the wearable electronic device 100 is very useful and very suitable for executing a desired operation or function of the user based on the touch input of the user.

Functions that are the most intuitively and effectively executed according to the use of the above-described shear force direction may include, but are not limited to, a screen scroll up/down, a page change, a horizontal screen movement, a vertical or horizontal cursor movement, an increase or decrease in an input value to be set, a screen enlargement or reduction, a volume adjustment, etc.

In this case, the wearable electronic device 100 may provide an additional function to a function corresponding to the shear force direction in consideration of an intensity attribute of the shear force.

For example, when the screen scroll up/down function is executed using the shear force direction, the larger the shear force intensity, the faster the wearable electronic device 100 may control the speed of the scrolling up/down the screen, and the smaller the shear force intensity, the slower the wearable electronic device 100 may control the speed of the scrolling up/down the screen.

As another example, when an increase or decrease in an input value is intended to be adjusted using the shear force direction, a speed of the increase or decrease of the input value may increase as the shear force intensity increases and may decrease as the shear force intensity decreases.

Similarly, the shear force intensity may be considered suitable for functions intended to be executed using the shear force direction.

The band touch may include a first band touch that is sensed through a first band touch sensor disposed on a first band portion BP1 and a second band touch that is sensed through a second band touch sensor disposed on a second band portion BP2.

In this case, although the first band touch and the second band touch have the same shear force attribute, the first band touch and the second band touch may correspond to different operations or functions. That is, when the shear force direction of the first band touch with respect to the first band portion BP1 is the first direction (i.e., a direction toward the watch head WH), the screen scroll-up function may be executed, and when the shear force direction of the second band touch with respect to the second band portion BP2 is the first direction (i.e., the direction toward the watch head WH), the screen scroll-down function may be executed.

Alternatively, when the first band touch having the shear force direction as the first direction corresponds to the screen scroll-up function, the second band touch having the shear force direction as the first direction may correspond to a volume-down function.

As shown in FIG. 14, the first band touch and the second band touch may be input at substantially the same time. That is, it is possible to input a multi-band touch.

In this case, an operation or function may correspond to a pair of a shear force attribute of the first band touch and a shear force attribute of the second band touch in consideration of both the shear force attribute of the first band touch and the shear force attribute of the second band touch.

Fourth Embodiment

Figure 15:
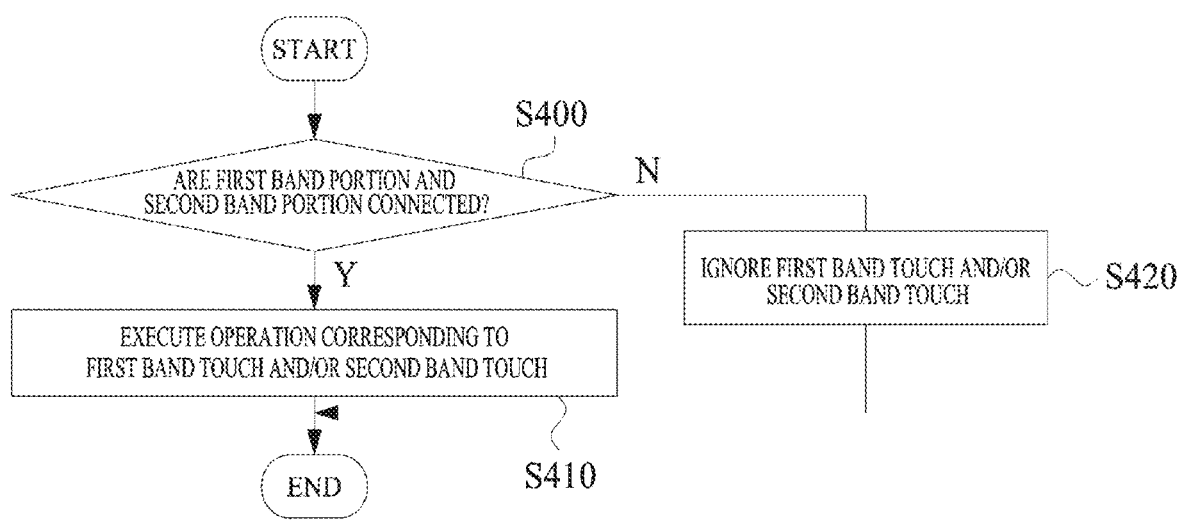
FIG. 15 is a flowchart illustrating an operation of a wearable electronic device according to a fourth embodiment of the present invention.
Figure 16A:
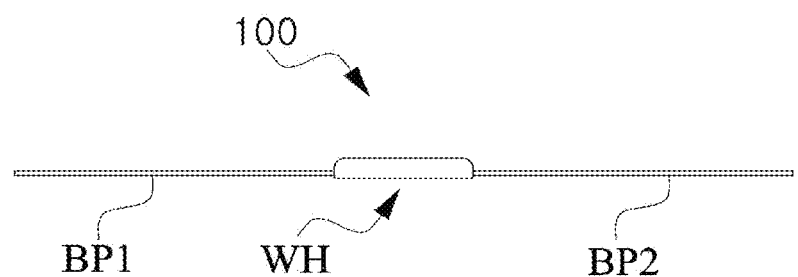
FIGS. 16A, 16B and 16C are reference diagrams illustrating the operation of the wearable electronic device according to the fourth embodiment of the present invention.
Figure 16B:
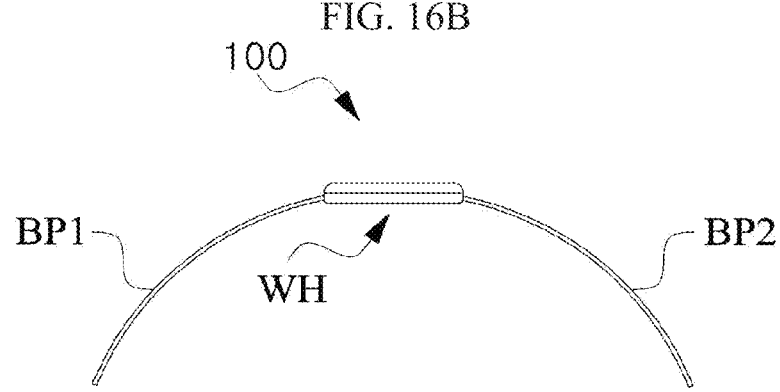
Figure 16C:
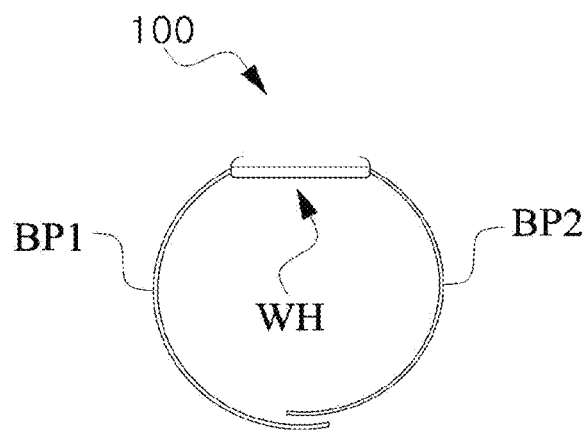

FIG. 15 is a flowchart illustrating an operation of a wearable electronic device according to a fourth embodiment of the present invention. Also, FIGS. 16A-16C are reference diagrams illustrating the operation of the wearable electronic device according to the fourth embodiment of the present invention.

Referring to FIG. 15, a wearable electronic device 100 may determine whether a first band portion and a second band portion are connected to each other (S400), and may execute an operation corresponding to an input of a first band touch and/or a second band touch when it is determined that the first band portion and the second band portion are connected to each other (S410).

That is, when it is determined that the first band portion and the second band portion are connected to each other and the first band touch is input only to the first band portion BP1, the wearable electronic device 100 may execute an operation corresponding to the first band touch.

Alternatively, when it is determined that the first band portion and the second band portion are connected to each other, the second band touch is input only to the second band portion BP2, the wearable electronic device 100 may execute an operation corresponding to the second band touch.

Alternatively, when the first band touch and the second band touch are respectively input to the first band portion BP1 and the second band portion BP2 at substantially the same time (i.e., a multi-band touch is input), the wearable electronic device 100 may execute the operations corresponding to the first band touch and the second band touch.

The wearable electronic device 100 according to the fourth embodiment of the present invention may include a separate connection detection sensor configured to sense whether the first band portion BP1 and the second band portion BP2 are connected to each other. For example, the connection detection sensor may be provided at one end of the first band portion BP1 (i.e., one of two ends of the first band portion BP1 that is not connected to a watch head WH and is connected with the second band portion BP2) or at one end of the second band portion BP2 (i.e., one of two ends of the second band portion BP2 that is not connected to the watch head WH and is connected with the first band portion BP1) and configured to determine whether the first band portion BP1 and the second band portion BP2 are connected to each other.

Only a portion of the connection detection sensor may be disposed at the one end of the first band portion BP1, and the other portion of the connection detection sensor may be disposed at the one end of the second band portion BP2.

Various methods such as an electric type (e.g., a method in which an electric current is applied only when the two band portions are connected) and a pressure type (e.g., a method in which a pressure that may be generated when the two band portions are connected is detected) may be applied as a sensing method for the connection detection sensor.

The wearable electronic device 100 may determine whether the first band portion BP1 and the second band portion BP2 are connected to each other according to a sensing value received from the connection detection sensor.

The wearable electronic device 100 may determine that the wearable electronic device 100 is worn by the user when it is determined that the first band portion BP1 and the second band portion BP2 are connected to each other.

The wearable electronic device 100 according to the fourth embodiment of the present invention may include a separate bending sensor configured to sense whether the first band portion BP1 and the second band portion BP2 are connected to each other.

The bending sensor may be included in any one or both of the first band portion BP1 and the second band portion BP2.

The bending sensor may sense whether the first band portion BP1 and/or the second band portion BP2 is in a bending state or in a flat state.

In this specification, the term "bending state" means that the band portions BP1 and BP2 are in a bent state such that the band portion BP1 and BP2 may be determined to be completely worn by the user (see FIG. 16C). Also, the term "flat state" includes a state in which the band portions BP1 and BP2 are entirely unbent (see FIG. 16A) and means that the band portions BP1 and BP2 are in a bent a little state such that the band portion BP1 and BP2 may be not to determine to be not completely worn by the user (see FIG. 16B).

That is, the bending sensor according to the described technology may sense a degree to which the band portions are bent and may determine whether the band portions are in the "bending state" or in the "flat state" based on a predetermined criterion.

The above-described bending sensor may also be implemented by the force direction sensor 131 that was described with reference to FIG. 3. As described above with reference to FIG. 3, the force direction sensor 131 may measure a pressure applied to a surface. When the force direction sensor 131 is disposed on the band portion BP1 or BP2, a strain applied to a surface of the band portion BP1 or BP2 may be detected through the force direction sensor 131 according to a degree to which the band portion BP1 or BP2 is bent. Accordingly, the force direction sensor 131 may be utilized to determine whether the band portion BP1 or BP2 is in the "bending state" or in the "flat state."

When at least one of the first band portion BP1 and the second band portion BP2 is in the flat state, the wearable electronic device 100 may determine that the first band portion BP1 and the second band portion BP2 are not connected to each other based on a sensing value received from the bending sensor.

On the other hand, when the first band portion BP1 and the second band portion BP2 are in the bending state, the wearable electronic device 100 may determine that the first band portion BP1 and the second band portion BP2 are connected to each other based on a sensing value received from the bending sensor.

Referring to FIG. 15 again, when it is determined that the first band portion BP1 and the second band portion BP2 are not connected to each other, the wearable electronic device 100 may ignore the first band touch input to the first band portion BP1 and the second band touch input to the second band portion BP2 (S320). That is, when the first band portion BP1 and the second band portion BP2 are not connected to each other, the wearable electronic device 100 may ignore operations or functions corresponding to band touches rather than execute them. Thus, it is possible to prevent the wearable electronic device 100 from malfunctioning due to an unintended band touch input of the user.

However, FIG. 15 shows an embodiment in which a band touch being input is ignored when it is determined that the first band portion BP1 and the second band portion BP2 are not connected to each other. Conversely, when the first band portion BP1 and the second band portion BP2 are not connected to each other, the wearable electronic device 100 may perform the same effect by deactivating the first band touch sensor disposed on the first band portion BP1 and the second band touch sensor disposed on the second band portion BP2. That is, the wearable electronic device 100 may activate the first band touch sensor and the second band touch sensor only when the first band portion BP1 and the second band portion BP2 are connected to each other.

In order to execute the operations corresponding to the first band touch and the second band touch, the wearable electronic device 100 may confirm band touch attributes including at least one or a combination of a band touch position, a band touch duration time, a band touch moving direction, a band touch pressure, and a band touch shear force direction.

The band touch position refers to a point at which a band touch of a user is input on the band portion BP1 or BP2. The band touch position may include whether the touch is to which of the first band portion BP1 and the second band portion BP2. Furthermore, the band touch position may include whether the touch is a band touch for a position of the first band portion BP1 or the second band portion BP2.

The band touch duration time refers to a duration time for which a band touch of a user is maintained on the band portion BP1 or BP2. For example, when a band touch starts at a first time point T1 and ends at a second time point T2, the band touch duration time may be defied as T2-T1.

The band touch moving direction may refer to a moving direction at a time at which a position of the band touch is changed in the band portion BP1 or BP2 while the band touch is maintained. In this specification, a direction toward the watch head WH from the band portion BP1 or BP2 is defined as a first direction, a direction away from the watch head WH is defined as a second direction, a direction toward an elbow of a user on the assumption the user wears the wearable electronic device 100 on his or her left wrist is defined as a third direction, and a direction toward a hand of the user is defined as a fourth direction.

The band touch pressure is an attribute that may be defined when the band touch sensor is configured to sense a touch pressure like the force direction sensor 131 that was described with reference to FIG. 3, and refers to a force intensity at a position of the band touch in a direction vertical to a touch surface.

The band touch shear force direction is an attribute that may be defined when the band touch sensor is configured to sense a shear force on a touch surface like the force direction sensor 131 that was described with reference to FIG. 3, and refers to a direction of a shear force measured at a position of a band touch while the band touch is maintained at one point as described above with reference to FIG. 3.

A function may be implemented by mutually combining the above-described first to fourth embodiments. It should be obvious that, as an example, the rim touch function described in the first embodiment may be implemented in the "bending state" described in the fourth embodiment and, as another example, a control signal for performing a predetermined function may be generated by combining the band touch shear force described in the third embodiment and the rim touch in the first embodiment.

That is, the above-described first to fourth embodiments may be independent of each other or a function may be implemented by combining at least two of the first to fourth embodiments according to a selection of a person skilled in the art.

The above-described subject matter of the described technology is to be considered illustrative and not restrictive, and it should be understood that numerous other modifications and embodiments can be devised by those skilled in the art that will fall within the spirit and scope of the principles of the described technology. Accordingly, the embodiments of the present invention can be implemented separately or in combination.

Accordingly, the embodiments of the present invention are to be considered descriptive and not restrictive of the present invention, and do not limit the scope of the present invention. The scope of the invention should be construed by the appended claims, and all technical ideas within the scope of their equivalents should be construed as included in the scope of the invention.

What is claimed is:

1. A wearable electronic device for a user's wrist, the wearable electronic device comprising:
   a display portion; a band portion configured to be worn on a user's wrist and connected to the display portion;
   a band touch sensor including a force direction sensor, the force direction sensor being disposed on the band portion and configured to detect a touch input by a finger on a touch area of the force direction sensor and touch force applied by the touch input at a plurality of points in the touch area; and
   a controller configured to:
   process the touch force applied by the touch input at the plurality of points in the touch area for obtaining a plurality of force intensities at the plurality of points in the touch area,
   determine a shear force direction of the touch input based on the plurality of force intensities at the plurality of points in the touch area, and
   generate a control signal for executing a corresponding operation based on the obtained shear force direction,
   wherein when determining the shear force direction of the touch input, the controller is configured to locate a first point of the plurality of points that has the greatest force intensity among the plurality of points and determine a direction from a center point of the touch area to the first point as the shear force direction.

2. The wearable electronic device of claim 1, wherein the controller is configured to generate the control signal further based on a shear force intensity.

3. The wearable electronic device of claim 1, wherein the band portion includes a first band portion connected to a first side of the display portion and a second band portion connected to a second side of the display portion, and wherein the band touch sensor includes a first band touch sensor disposed on the first band portion and a second band touch sensor disposed on the second band portion.

4. The wearable electronic device of claim 3, wherein the controller is configured to receive a first band touch through the first band touch sensor and a second band touch through the second band touch sensor and generate a-the control signal for executing a-the corresponding operation based the shear force direction of the first band touch and the shear force direction of the second band touch.

5. A wearable electronic device for a user's wrist, the wearable electronic device comprising:
   a display portion;
   a first band portion connected to a first side of the display portion;
   a second band portion connected to a second side of the display portion;
   a first band touch sensor disposed on the first band portion and configured to receive a first band touch;
   a second band touch sensor disposed on the second band portion and configured to receive a second band touch; and
   a controller configured to determine whether the first band portion and the second band portion are connected to each other,
   wherein the controller is further configured to generate a control signal for executing a first operation corresponding to the first band touch, a second operation corresponding to the second band touch or a third operation corresponding to a combination of the first band touch and the second band touch, based on the first band touch and the second band touch being respectively input through the first band touch sensor and the second band touch sensor, in response to determining that the first band portion and the second band portion are connected to each other, wherein at least one of the first band touch sensor and the second band touch sensor includes a bending sensor configured to sense whether at least one of the first band portion and the second band portion is in the flat state or in the bending state, and wherein the controller is configured to determine that the first band portion and the second band portion are not connected to each other based on a sensing value received by the bending sensor when at least one of the first band portion and the second band portion is in the flat state.

6. The wearable electronic device of claim 5, wherein the controller is configured to determine that the first band portion and the second band portion are connected to each other based on a sensing value received from a connection detection sensor included in at least one of an end of the first band portion connected to the second band portion and an end of the second band portion connected to the first band portion.

7. The wearable electronic device of claim 5, wherein the controller is configured to determine that the first band portion and the second band portion are connected to each other based on a sensing value received by the bending sensor when the first band portion and the second band portion are in the bending state.

8. The wearable electronic device of claim 5, wherein the controller is configured to ignore the first band touch and the second band touch input to the first band touch sensor and the second band touch sensor, in response to determining that the first band portion and the second band portion are not connected to each other.

9. The wearable electronic device of claim 5, wherein the controller is configured to deactivate the first band touch sensor and the second band touch sensor in response to determining that the first band portion and the second band portion are not connected to each other.

10. The wearable electronic device of claim 5, wherein the first band touch and the second band touch have attributes including at least one or a combination of a band touch position, a band touch duration time, a band touch moving direction, a band touch pressure and a band touch shear force direction.

11. The wearable electronic device of claim 5, wherein the controller is configured to perform an operation corresponding to the first band touch based on at least one of attributes of the first band touch.

12. The wearable electronic device of claim 5, wherein the controller is configured to perform an operation corresponding to the second band touch based on at least one of attributes of the second band touch.

13. The wearable electronic device of claim 5, wherein the controller is configured to perform an operation corresponding to the first band touch and the second band touch based on at least one of attributes of the first band touch and at least one of attributes of the second band touch.

* * * * *

UNITED STATES PATENT AND TRADEMARK OFFICE
CERTIFICATE OF CORRECTION

PATENT NO. : 10,996,848 B2  
APPLICATION NO. : 16/789326  
DATED : May 4, 2021  
INVENTOR(S) : Kunnyun Kim et al.

Page 1 of 1

It is certified that error appears in the above-identified patent and that said Letters Patent is hereby corrected as shown below:

In the Specification

In Column 3, Line 14, delete "with a" and insert -- with an --.

In Column 5, Line 47, delete "(Wimax)," and insert -- (WiMAX), --.

In Column 11, Line 21, delete "sensed. when" and insert -- sensed. When --.

In Column 13, Line 50, after "portion" insert -- may --.

In Column 14, Line 38, delete "p1" and insert -- P1 --.

In Column 16, Line 36, delete "users" and insert -- user's --.

In the Claims

In Column 27, Line 55, Claim 4, delete "a-the" and insert -- the --.

In Column 27, Line 56, Claim 4, delete "a-the" and insert -- the --.

In Column 27, Line 56, Claim 4, delete "based the" and insert -- based on the --.

Signed and Sealed this  
Tenth Day of August, 2021

Drew Hirshfeld  
*Performing the Functions and Duties of the  
Under Secretary of Commerce for Intellectual Property and  
Director of the United States Patent and Trademark Office*